US008458260B2

(12) United States Patent
Nobori et al.

(10) Patent No.: US 8,458,260 B2
(45) Date of Patent: *Jun. 4, 2013

(54) INFORMATION PROCESSING UNIT, CONTENT PROVIDING SERVER, COMMUNICATION RELAY SERVER, INFORMATION PROCESSING METHOD, CONTENT PROVIDING METHOD AND COMMUNICATION RELAY METHOD

(75) Inventors: Fujio Nobori, Kanagawa (JP); Mamoru Tokashiki, Tokyo (JP); Nariaki Satoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,979

(22) Filed: Dec. 27, 2011

(65) Prior Publication Data

US 2012/0166560 A1 Jun. 28, 2012

Related U.S. Application Data

(63) Continuation of application No. 12/238,701, filed on Sep. 26, 2008, now Pat. No. 8,086,679.

(30) Foreign Application Priority Data

Oct. 5, 2007 (JP) ................................ P2007-262358

(51) Int. Cl.
*G06F 15/16* (2006.01)
(52) U.S. Cl.
USPC ......................................... 709/205; 709/204
(58) Field of Classification Search
USPC ............... 709/204–207, 238, 240; 725/37–61
See application file for complete search history.

(56) References Cited

U.S. PATENT DOCUMENTS

| 5,828,839 A | 10/1998 | Moncreiff |
| 6,778,642 B1 | 8/2004 | Schmidt, Jr. et al. |
| 7,480,696 B2 | 1/2009 | Kirkland et al. |
| 7,539,732 B2 | 5/2009 | Kelso |
| 7,921,163 B1 | 4/2011 | Odell et al. |
| 2002/0112239 A1 | 8/2002 | Goldman |
| 2002/0144273 A1 | 10/2002 | Reto |
| 2002/0167947 A1 | 11/2002 | Hallford et al. |
| 2002/0194603 A1 | 12/2002 | Connelly |
| 2005/0076368 A1 | 4/2005 | Lee |
| 2005/0091694 A1 | 4/2005 | Rambo |
| 2005/0132420 A1 | 6/2005 | Howard et al. |
| 2005/0149622 A1 | 7/2005 | Kirkland et al. |

(Continued)

FOREIGN PATENT DOCUMENTS

| JP | 2002-183021 | 6/2002 |
| JP | 2004-062812 | 2/2004 |

(Continued)

*Primary Examiner* — Brendan Higa
(74) *Attorney, Agent, or Firm* — Finnegan, Henderson, Farabow, Garrett & Dunner, LLP

(57) ABSTRACT

An information processing unit which acquires content data from a content providing server and is capable of reproducing the acquired content data, including: a content information acquiring portion for acquiring content information including content data and meta data of the content data; a display control portion which carries out display control for reproducing the content data on a display portion; and a bidirectional communication portion which carries out bidirectional communication with other information processing unit connected to the content providing server, in which, when the content data is reproduced, the bidirectional communication portion selects a communication message to be received from communication messages sent from the other information processing unit corresponding to an execution state of the bidirectional communication.

7 Claims, 28 Drawing Sheets

| | MESSAGE | MESSAGE FROM A SPECIFIC USER | CHANGE OF USER STATUS AND USER LIST |
|---|---|---|---|
| STATE USING NO CHAT FUNCTION | O | O | O |
| STATE RECEIVING FIRST MESSAGE | X | X | X |
| STATE DISPLAYING A LIST | X | X | O |
| ON CHAT | X | O | X |

U.S. PATENT DOCUMENTS

| | | |
|---|---|---|
| 2005/0216942 A1 | 9/2005 | Barton |
| 2005/0262542 A1 | 11/2005 | DeWeese et al. |
| 2006/0036703 A1 | 2/2006 | Fulmer et al. |
| 2006/0036739 A1 | 2/2006 | Hagale et al. |
| 2006/0075029 A1 | 4/2006 | Kelso et al. |
| 2007/0088793 A1 | 4/2007 | Landsman |
| 2007/0101368 A1 | 5/2007 | Jacoby et al. |
| 2008/0010659 A1 | 1/2008 | Zenith |
| 2008/0307040 A1 | 12/2008 | So |
| 2009/0228944 A1 | 9/2009 | Bodlaender |

FOREIGN PATENT DOCUMENTS

| | | |
|---|---|---|
| JP | 2004-342095 | 12/2004 |
| JP | 2005-050256 | 2/2005 |
| JP | 2006-018833 | 1/2006 |
| JP | 2007-535039 | 11/2007 |
| WO | WO 2005/106685 | 11/2005 |

FIG.15

| 601 TITLE | 603 DESCRIPTION | 605 RATING | 607 EVALUATION | 609 EPISODE No. | 611 TIME | 613 CATEGORY | 615 CONTENT URL |
|---|---|---|---|---|---|---|---|
| A | ○○○○ | — | 3 | 1/3 | 0h57m45s | DRAMA | ○○○×× |
| A | ×××× | — | 5 | 2/3 | 0h55m40s | DRAMA | ○○○△△△ |
| A | △△△△ | — | 2 | 3/3 | 0h56m18s | DRAMA | ○○○□□□ |
| B | ○×○× | PG18 | 5 | — | 2h19m48s | MOVIE | ○×○×○× |
| C | ×△×△ | — | 0 | — | 0h55m38s | FAMILY | ×△×△×△ |
| ... | ... | ... | ... | ... | ... | ... | ... |

FIG.16

| 701 | 703 | 705 | 707 | 709 | 711 |
|---|---|---|---|---|---|
| USER ID | CONNECTING STATE | ENJOYED CONTENT | FRIEND USER ID | FRIEND USER CONNECTING STATE | CONTENT ENJOYED BY FRIEND USER |
| U1 | ON LINE | 111 | U2 | ON LINE | 202 |
| U2 | ON LINE | 202 | U4 | OFF LINE | None |
| U3 | OFF LINE | None | U1 | ON LINE | 111 |
| U4 | OFF LINE | None | U5 | OFF LINE | None |
| ... | ... | ... | U1 | ON LINE | 111 |

FIG.25

| | MESSAGE | MESSAGE FROM A SPECIFIC USER | CHANGE OF USER STATUS AND USER LIST |
|---|---|---|---|
| STATE USING NO CHAT FUNCTION | O | O | O |
| STATE RECEIVING FIRST MESSAGE | × | × | × |
| STATE DISPLAYING A LIST | × | × | O |
| ON CHAT | × | O | × |

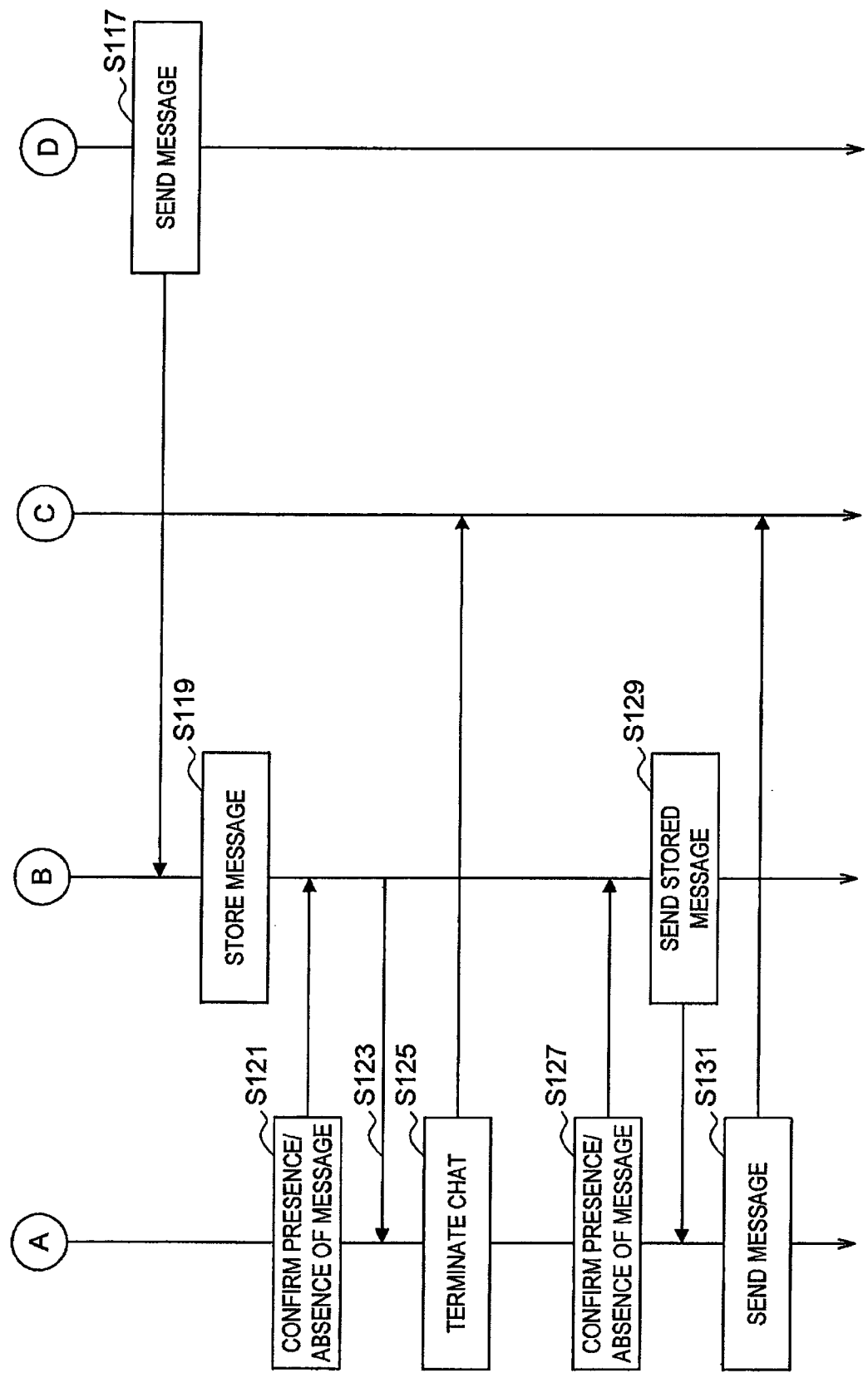

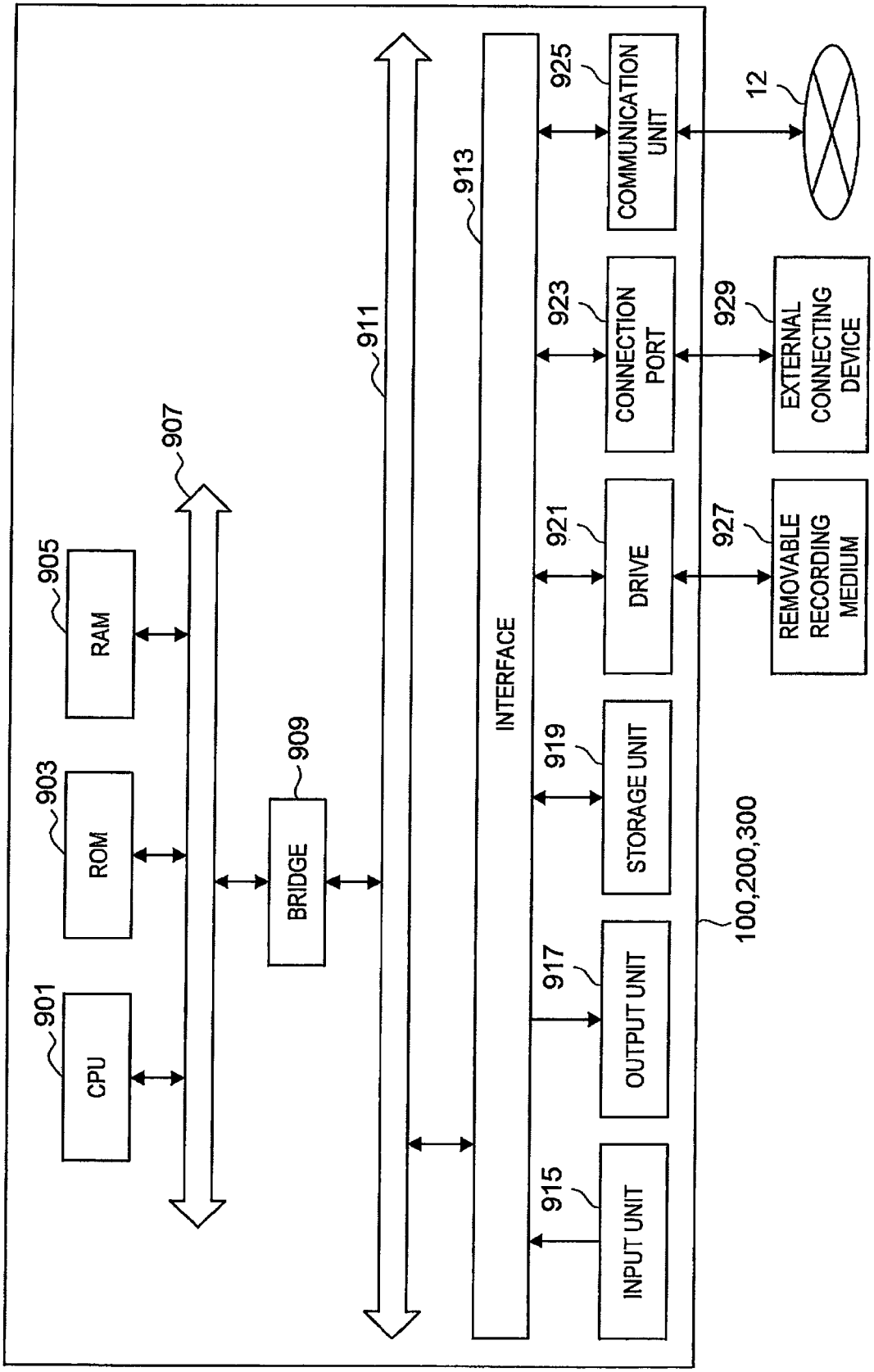

INFORMATION PROCESSING UNIT, CONTENT PROVIDING SERVER, COMMUNICATION RELAY SERVER, INFORMATION PROCESSING METHOD, CONTENT PROVIDING METHOD AND COMMUNICATION RELAY METHOD

CROSS-REFERENCE TO RELATED APPLICATION

This is a continuation of application Ser. No. 12/238,701, filed Sep. 26, 2008 now U.S. Pat. No. 8,086,679, which is based upon and claims priorities from Japanese Patent Application JP2007-262358 filed in the Japan Patent Office on Oct. 5, 2007, the entire contents of both of which are incorporated herein by reference.

BACKGROUND OF THE INVENTION

1. Field of the Invention

The present invention relates to an information processing unit, a content providing server, a communication relay server, an information processing method, a content providing method and a communication relay method.

2. Description of the Related Art

With progress of information communication technology in recent years, chat by sending/receiving a message among plural information processing units connected to each other via network to enjoy real-time conversation has been executed widely.

The topic of the chat can be set up freely among users enjoying that chat and there may occur a case where users desire to enjoy a chat based on a TV program while watching a broadcasted TV program. Thus, a messaging system capable of exchanging information about the TV program at real time while users are watching that TV program has been already proposed (see, for example, Japanese Patent Application Laid-Open No. 2003-189282)

SUMMARY OF THE INVENTION

Chat with an instant message in related art has been performed (1) by a method in which information processing units for performing the chat are connected directly to each other so as to exchange a message and (2) the information processing units are connected to a specified server so as to exchange a message through the server. In any case, when user is chatting with a certain mate, if a message is sent from other mate, the information processing unit needs to receive the message sent from that mate.

In such a situation, there is no problem if the information processing unit which is executing the chat is a device having a large display region and a sufficient memory resource like a personal computer (PC), but unless the information processing unit has such a function or display region which allows plural chat sessions to be displayed, the information processing unit needs to hold the message sent from a different mate until the chat session currently being performed is ended.

However, there is a possibility that a number of messages arrives at an information processing unit from plural mates and such a device having no sufficient memory resource has an issue that holding all messages is not practical.

Accordingly, the present invention has been achieved in views of such an issue and it is desirable to provide a novel and improved information processing unit, content providing server, communication relay server, information processing method, content providing method and communication relay method, which allow bidirectional communication with plural external devices to be executed with convenience even if a limited I/O function is possessed and a sufficient memory resource can hardly be used.

According to an embodiment of the present invention, there is provided an information processing unit which acquires content data from a content providing server and is capable of reproducing the acquired content data, including: a content information acquiring portion for acquiring content information including content data and meta data of the content data; a display control portion which carries out display control for reproducing the content data on a display portion; and a bidirectional communication portion which carries out bidirectional communication with other information processing unit connected to the content providing server, wherein when the content data is reproduced, the bidirectional communication portion selects a communication message to be received from communication messages sent from the other information processing unit corresponding to an execution state of the bidirectional communication.

With such a structure, the content information acquiring portion acquires content information including the content data and meta data of the content data and the display control portion executes display control so as to reproduce the content data on the display portion. The bidirectional communication portion executes bidirectional communication with other information processing unit connected to the content providing server. Further, the bidirectional communication portion selects a communication message to be received from the communication messages sent from the other information processing units corresponding to an execution state of the bidirectional communication. Because the information processing unit of the present invention selects a communication message to be received from the communication messages sent to that information processing unit corresponding to the execution state of the bidirectional communication, it can carry out the bidirectional communication with plural external devices with convenience even if only a limited I/O function is possessed and no sufficient memory resource can be used.

The bidirectional communication portion may check a server which holds the communication message of the bidirectional communication about presence/absence of a communication message sent from the other information processing unit to the information processing unit every predetermined time interval and acquire the received communication message from the server which holds the communication message.

The bidirectional communication portion may specify a number of the communication messages not received of the communication messages sent from the other information processing unit, and the display control portion may display the number of the not-received communication messages on the display portion.

The bidirectional communication portion, when the bidirectional communication is carried out with the other information processing unit, may receive only a communication message sent from the other information processing unit which is carrying out the bidirectional communication.

The bidirectional communication portion, when the communication message sent from the other information processing unit is received, may not receive other communication message sent to the information processing unit.

The display control portion is capable of indicating the connecting state of the other information processing unit acquired from the content providing server on the display portion during reproduction of the content data, and the bidirectional communication portion, when the connecting state of the other information processing unit is displayed on the display, may not receive the communication message of the bidirectional communication sent to the information processing unit.

The bidirectional communication portion, when the bidirectional communication with the other information processing unit is not carried out, may receive all the communication messages of the bidirectional communication sent to the information processing unit.

According to another embodiment of the present invention, there is provided a content providing server which provides the content data to an information processing unit which acquires content data from an external server and is capable of reproducing the acquired content data, including: a content information acquiring portion for acquiring content information including content data and meta data of the content data; a display control portion which carries out display control for reproducing the content data on a display portion; and a bidirectional communication portion which carries out bidirectional communication with other information processing unit connected to the external server, the content providing server including: a content information memory portion which memorizes the content data and meta data of a content corresponding to the content data in correlation with each other; a content information distribution portion which distributes at least any one of the content data and the meta data of a content corresponding to the content data; and a communication control portion for controlling bidirectional communication implemented among plural the information processing units connected to the content providing server.

According to still another embodiment of the present invention, there is provided a communication relay server which relays the bidirectional communication implemented between an information processing unit which acquires content data from a content providing server and is capable of reproducing the acquired content data, including: a content information acquiring portion for acquiring content information including content data and meta data of the content data; a display control portion which carries out display control for reproducing the content data on a display portion; and a bidirectional communication portion which carries out bidirectional communication with other information processing unit connected to the content providing server, the communication relay server including: a bidirectional communication relay portion which determines communication information relating to the bidirectional communication exchanged between the information processing unit and the other information processing unit and relays the communication information relating to the bidirectional communication; and a memory portion which temporarily stores the communication message sent from the other information processing unit to the information processing unit among the pieces of communication information relating to the bidirectional communication.

According to a further embodiment of the present invention, there is provided an information processing method for an information processing unit which acquires content data from a content providing server and is capable of reproducing the acquired content data and executing bidirectional communication with other information processing unit connected to the content providing server, including a step of: when the content data is reproduced, selecting a communication message to be received from communication messages sent from the other information processing unit, corresponding to an execution state of the bidirectional communication.

According to a further embodiment of the present invention, there is provided a communication relay method for a communication relay server which relays the bidirectional communication implemented between an information processing unit which acquires content data from a content providing server and is capable of reproducing the acquired content data and of executing bidirectional communication with other information processing unit connected to the content providing server and the other information processing unit, including the steps of: determining communication information relating to the bidirectional communication exchanged between the information processing unit and the other information processing unit; and relaying the communication information relating to the bidirectional communication.

According to a still further embodiment of the present invention, there is provided a program which makes a computer function as an information processing unit which acquires content data from a content providing server and is capable of reproducing the acquired content data, so as to make the computer to achieve: a content information acquiring function of acquiring content information including content data and meta data of the content data; a display control function which carries out display control for reproducing the content data on a display portion; and a bidirectional communication function which carries out bidirectional communication with other information processing unit connected to the content providing server.

With such a configuration, the computer program is stored in the memory portion possessed by the computer and read into a CPU possessed by the computer and executed, so as to make the computer function as the information processing unit. Further, a computer readable recording medium in which the computer program is recorded can be provided. The recording medium includes, for example, a magnetic disk, optical disk, photomagnetic disk, and flash memory. The aforementioned computer program may be distributed through, for example, network without use of any recording medium.

According to a still further embodiment of the present invention, there is provided a program which makes a computer function as a content providing server which provides the content data to an information processing unit which acquires content data from an external server and is capable of reproducing the acquired content data, including: a content information acquiring portion for acquiring content information including content data and meta data of the content data; a display control portion which carries out display control for reproducing the content data on a display portion; and a bidirectional communication portion which carries out bidirectional communication with other information processing unit connected to the external server, so as to make the computer to achieve: a content information memory function which memorizes the content data and meta data of a content corresponding to the content data in correlation with each other; a content information distribution function which distributes at least any one of the content data and the meta data of a content corresponding to the content data; and a communication control function of controlling bidirectional communication implemented among plural the information processing units connected to the content providing server.

With such a configuration, the computer program is stored in the memory portion possessed by the computer and read into a CPU possessed by the computer and executed, so as to make the computer function as the content providing server. Further, a computer readable recording medium in which the computer program is recorded can be provided. The recording medium includes, for example, a magnetic disk, optical disk, photomagnetic disk, and flash memory. The aforementioned computer program may be distributed through, for example, network without use of any recording medium.

According to a still further embodiment of the present invention, there is provided a program which makes a computer function as a communication relay server which relays the bidirectional communication implemented between an information processing unit which acquires content data from a content providing server and is capable of reproducing the acquired content data, including: a content information acquiring portion for acquiring content information including content data and meta data of the content data; a display control portion which carries out display control for reproducing the content data on a display portion; and a bidirectional communication portion which carries out bidirectional communication with other information processing unit connected to the content providing server and the other information processing unit, so as to make the computer achieve: a bidirectional communication relay function which determines communication information relating to the bidirectional communication exchanged between the information processing unit and the other information processing unit; and a memory function which temporarily stores the communication message sent from the other information processing unit to the information processing unit among the pieces of communication information relating to the bidirectional communication.

With such a configuration, the computer program is stored in the memory portion possessed by the computer and read into a CPU possessed by the computer and executed, so as to make the computer function as the communication relay server. Further, a computer readable recording medium in which the computer program is recorded can be provided. The recording medium includes, for example, a magnetic disk, optical disk, photomagnetic disk, and flash memory. The aforementioned computer program may be distributed through, for example, network without use of any recording medium.

According to the embodiments of the present invention described above, the information processing unit is capable of executing bidirectional communication with plural external devices with convenience even if only a limited I/O function is possessed and no sufficient memory resource can be used.

BRIEF DESCRIPTION OF THE DRAWINGS

FIG. 15 is an explanatory diagram for explaining an example of meta data which a content information distribution portion according to the embodiment sends;

FIG. 16 is an explanatory diagram for explaining connection control information generated by a connecting state control portion according to the embodiment;

FIG. 25 is an explanatory diagram for explaining the bidirectional communication executed by the information processing unit according to the embodiment;

FIG. 26B is a flow chart for explaining the bidirectional communication method executed by the information processing unit according to the embodiment; and FIG. 27 is a block diagram for explaining a hardware structure of the content providing server, communication relay server and information processing unit according to the embodiment.

DETAILED DESCRIPTION OF THE PREFERRED EMBODIMENTS

Figure 1:
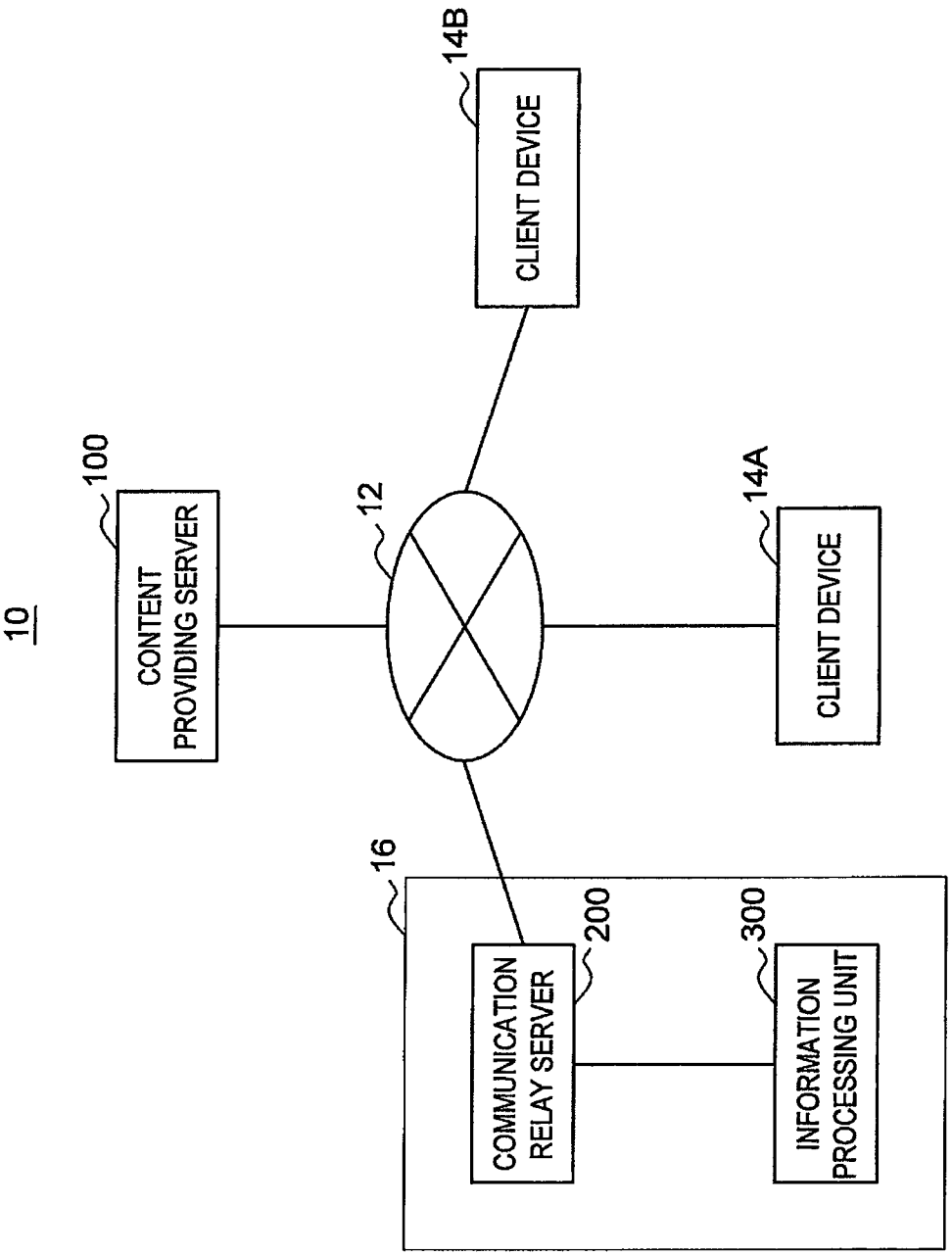
FIG. 1 is an explanatory diagram for explaining a content providing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(First Embodiment)

<About Content Providing System According to this Embodiment>

The content providing system according to this embodiment will be described in detail with reference to FIG. 1. FIG. 1 is an explanatory diagram for explaining the content providing system according to this embodiment.

As shown in FIG. 1 for example, the content providing system 10 according to this embodiment includes a content providing server 100, a communication relay server 200 and an information processing unit 300. The content providing server 100 is connected to the communication relay server 200 via a communication network 12 and the communication relay server 200 and the information processing unit 300 constitute a home network 16. Plural client devices 14A, 14B are connected to the communication network 12.

The communication network 12 is a communication network for connecting the content providing server 100, the communication relay server 200 and the plural client devices 14 to be able to carry out bidirectional communication or single-direction communication. This communication network is constituted of, for example, public network such as Internet, telephone network, satellite network, broadcast network, and leased line network such as wide area network (WAN), local area network (LAN), Internet protocol-virtual private network (IP-VPN), Ethernet (registered trade mark), wireless LAN, while both wired and wireless are used.

The content providing server 100 controls contents such as video content, music content, photo content and provides content data and content meta data corresponding to a content controlled by the content providing server 100, in response to a request from the information processing unit 300 or the client device 14. The content providing server 100 may be a digital media server (DMS) based on DLNA guide line. In the meantime, the content providing server 100 will be described in detail below.

The communication relay server 200 is located on a border between the communication network 12 and the home network 16, so as to relay for bidirectional communication such as a chat to be carried out between the information processing unit 300 described later and the client device 14. This communication relay server 200 has a sufficient network resource and memory resource, and can store communication content of the bidirectional communication carried out between the information processing unit 300 and the client device 14. This communication relay server 200 may be a DMS based on DLNA guide line or a digital media player (DMP). In the meantime, the communication relay server 200 will be described in detail below.

The information processing unit 300 is connected to the content providing server 100 via the communication relay server 200 and the communication network 12 and receives a content list and content meta data controlled by the server 100 and displays a list of reproducible contents. Further, the information processing unit 300 requests the content providing server 100 to provide the content data corresponding to a specification of user of the information processing unit 300 and reproduces the acquired content data. The information processing unit 300 can communicate with plural client devices 14 described later by bidirectional communication such as char through the communication relay server 200 and the content providing server 100. The information processing unit 300 may be a DMS based on the DLNA guideline or a digital media player (DMP). In the meantime, the information processing unit 300 will be described in detail below.

The client device 14 is connected to the content providing server 100 through the communication network 12 and can reproduce a content acquired from the content providing server 100. The client device 14 can carry out bidirectional communication such as chat between the other client device 14 and the information processing unit 300 through the communication network 12 and the content providing server 100.

In the meantime, the information processing unit 300 and the client device 14 are not limited to a computer unit (regardless of whether the notebook type or desktop type) such as a personal computer (PC), and may be a TV receiver, DVD/HDD recorder, Blu-ray recorder, portable phone, PDA, digital camera and the like. Any device having communication function via network can be constituted of, for example, home use game machine, information household appliance such as digital video camera, TV broadcasting tuner or decoder. The information processing unit 300 and the client device 14 may be a portable device which a subscriber can carry, for example, a portable game machine, PHS, portable video/sound player and the like.

The communication relay server 200 may be formed separately from the content providing server 100 as shown in FIG. 1 and the content providing server 100 may be provided with the function of the communication relay server 200 as an additional function. The communication relay server 200 may be connected not within the home network 16 but within the communication network 12.

<Example of Application for Use in Information Processing Unit According to this Embodiment>

Subsequently, an example of the application for use in an information processing unit 300 of this embodiment will be described with reference to FIG. 2-FIG. 13. FIG. 2-FIG. 13 are explanatory diagrams for explaining an example of an application for use in the information processing unit 300 according to this embodiment.

Figure 2:
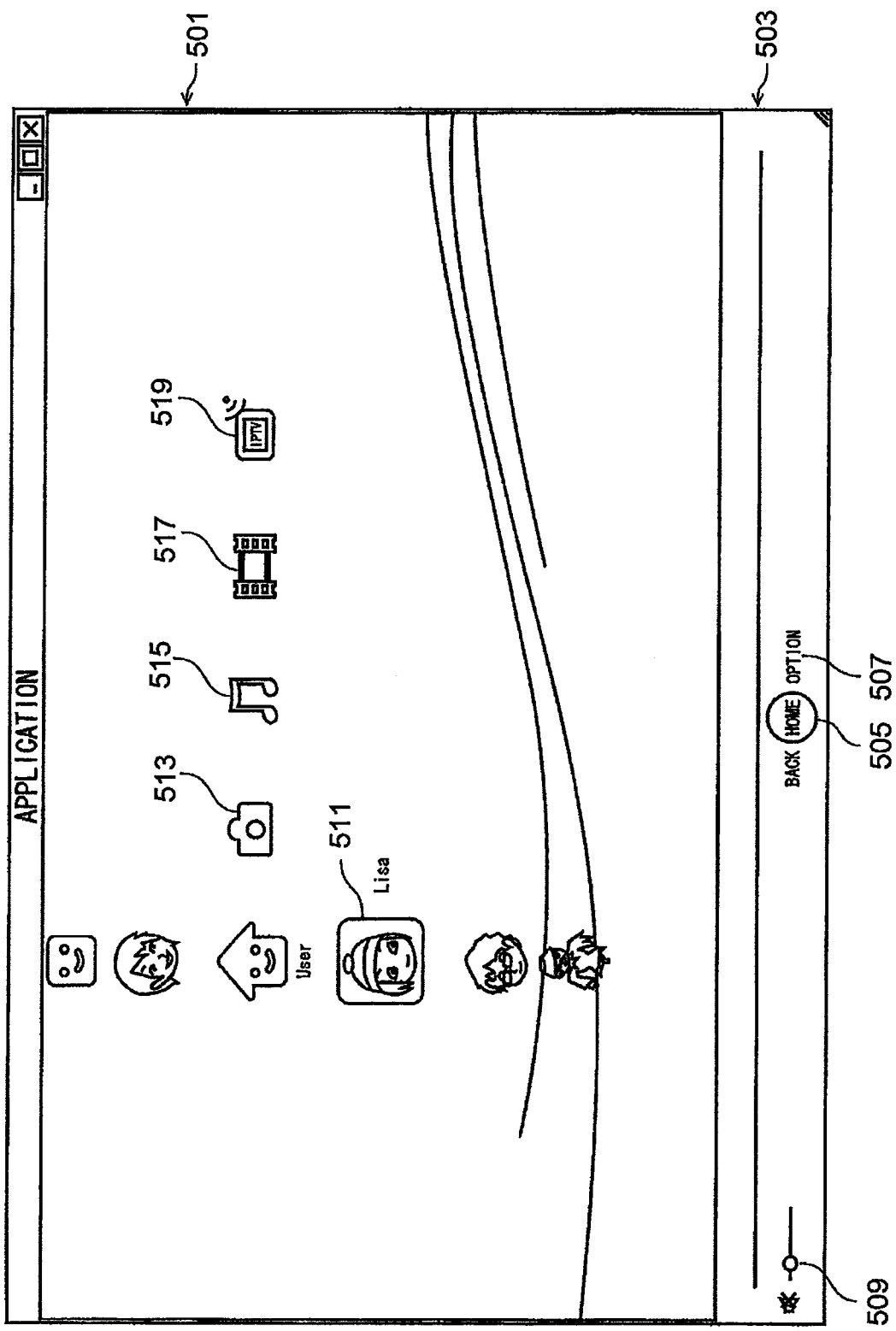
FIG. 2 is an explanatory diagram for explaining an example of an application for use in an information processing unit according to the embodiment.

In the information processing unit 300 according to this embodiment, if an application which allows the content to be watched/listened is started by user's operation, a screen shown in FIG. 2 is displayed as an initial screen. The initial screen includes an information display region 501 in which various kinds of information is displayed, and an operation object display region 503 in which a "HOME" icon 505 for returning to the initial screen, an "OPTION" icon 507 for moving to an option setting screen, a sound volume setting button 509 and other objects are disposed.

User of the information processing unit 300 selects various kinds of contents which user desires to watch or listen to from an user selection icon 511 displayed in the information display region 501 after the user selects an icon corresponding to a user ID for use in watching or listening. Referring to FIG. 2, an icon 513 for reviewing photo content such as still image, an icon 515 for reproducing music content, an icon 517 for watching or listening to a movie content such as animation, an icon 519 for watching or listening to a distribution type content such as IPTV and video on demand (VoD) are disposed as an example of a content which can be watched or listened to. User can enjoy a desired content by selecting these icons.

Figure 3:
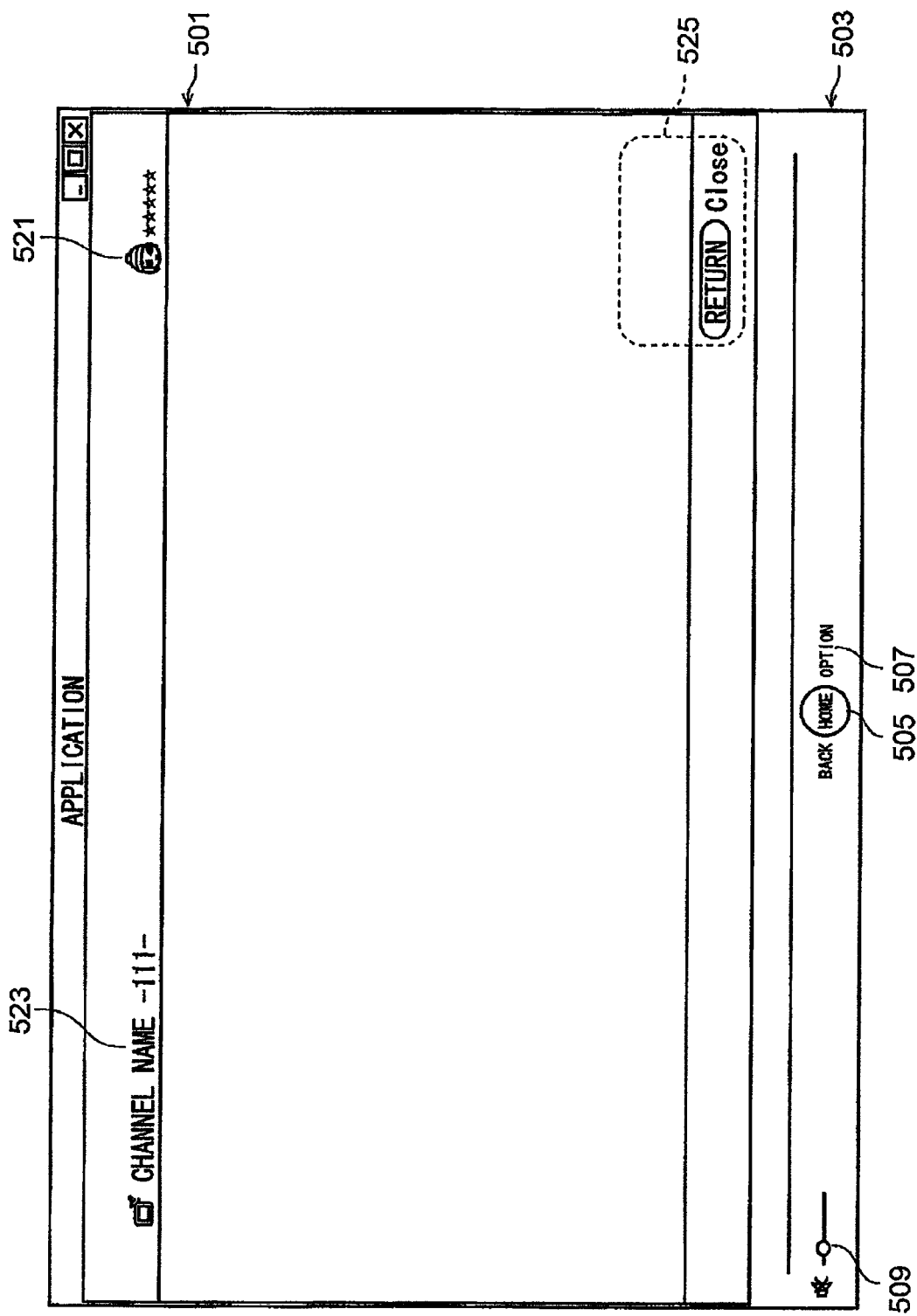
FIG. 3 is an explanatory diagram for explaining the example of the application for use in the information processing unit according to the embodiment.

If user selects the icon 519 for watching or listening to a content such as IPTV and after that, determines a desired content for watching/listening, a screen shown in FIG. 3 is displayed on the display portion of the information processing unit 300. In the display screen when any content is watched or listened to, as shown in FIG. 3, user's icon 521 selected on the initial screen and information 523 for specifying a content being watched or listened to such as the name of the content are displayed in the upper portion of the information display region 501, and the content of the content being watched or listened to currently are displayed in other portion of the information display region 501. In an operation object display region 503, a "RETURN" icon for returning to a previous screen, a "CLOSE" icon for closing the screen and an operation object 525 for executing a predetermined operation on the information display region 501 are displayed.

Figure 4:
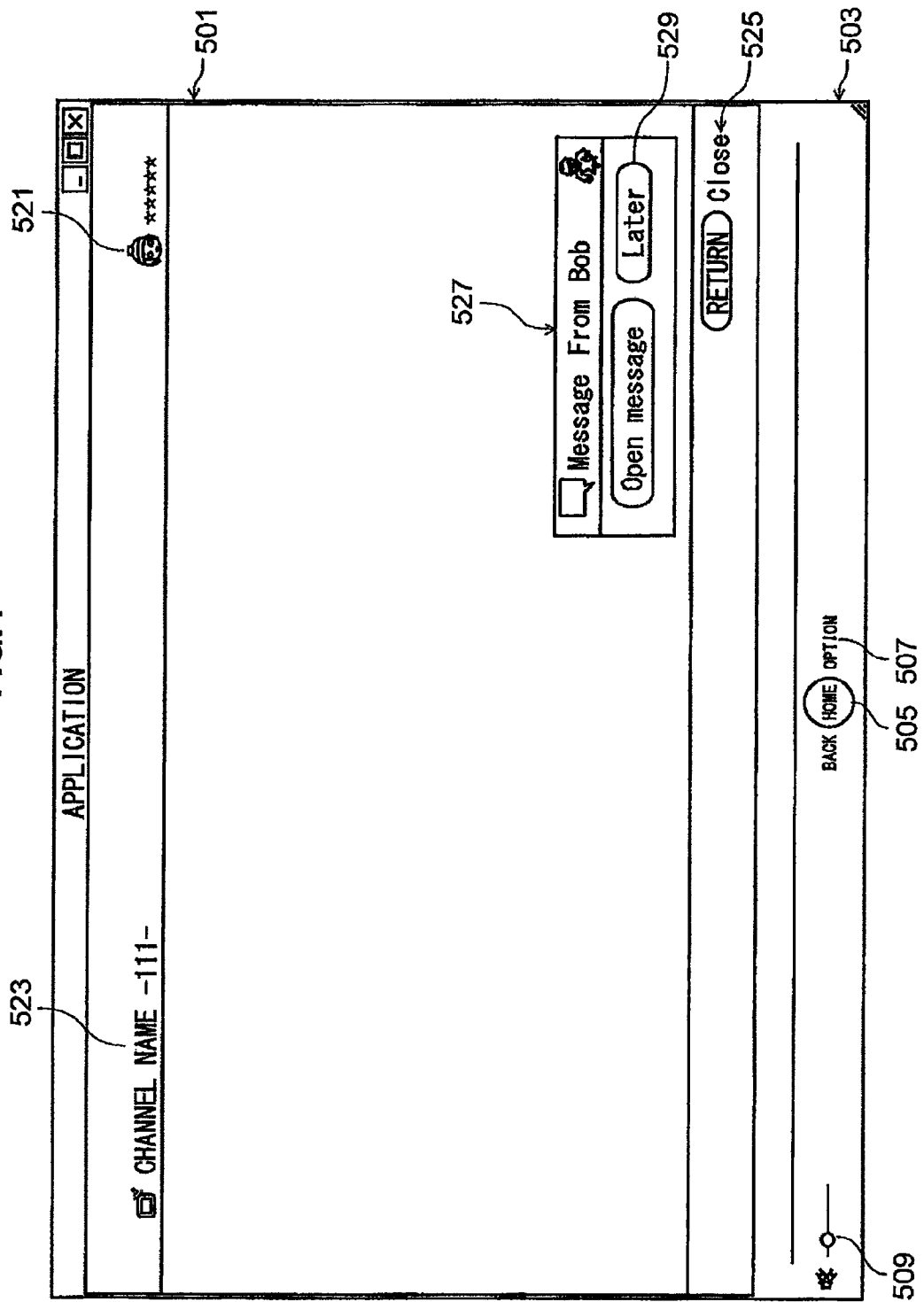
FIG. 4 is an explanatory diagram for explaining the example of the application for use in the information processing unit according to the embodiment.

When any content is being watched or listened to, a message is sometimes sent from user of the client device 14 connected to the communication network 12. In that case, message reception information 527 which says that a message is received is displayed in part of the information display region 501 as shown in FIG. 4 and an object 529 for selecting which the message is to be confirmed immediately or later is displayed. User of the information processing unit 300 can select whether or not the received message is to be displayed by selecting any one of the objects 529.

Figure 5:
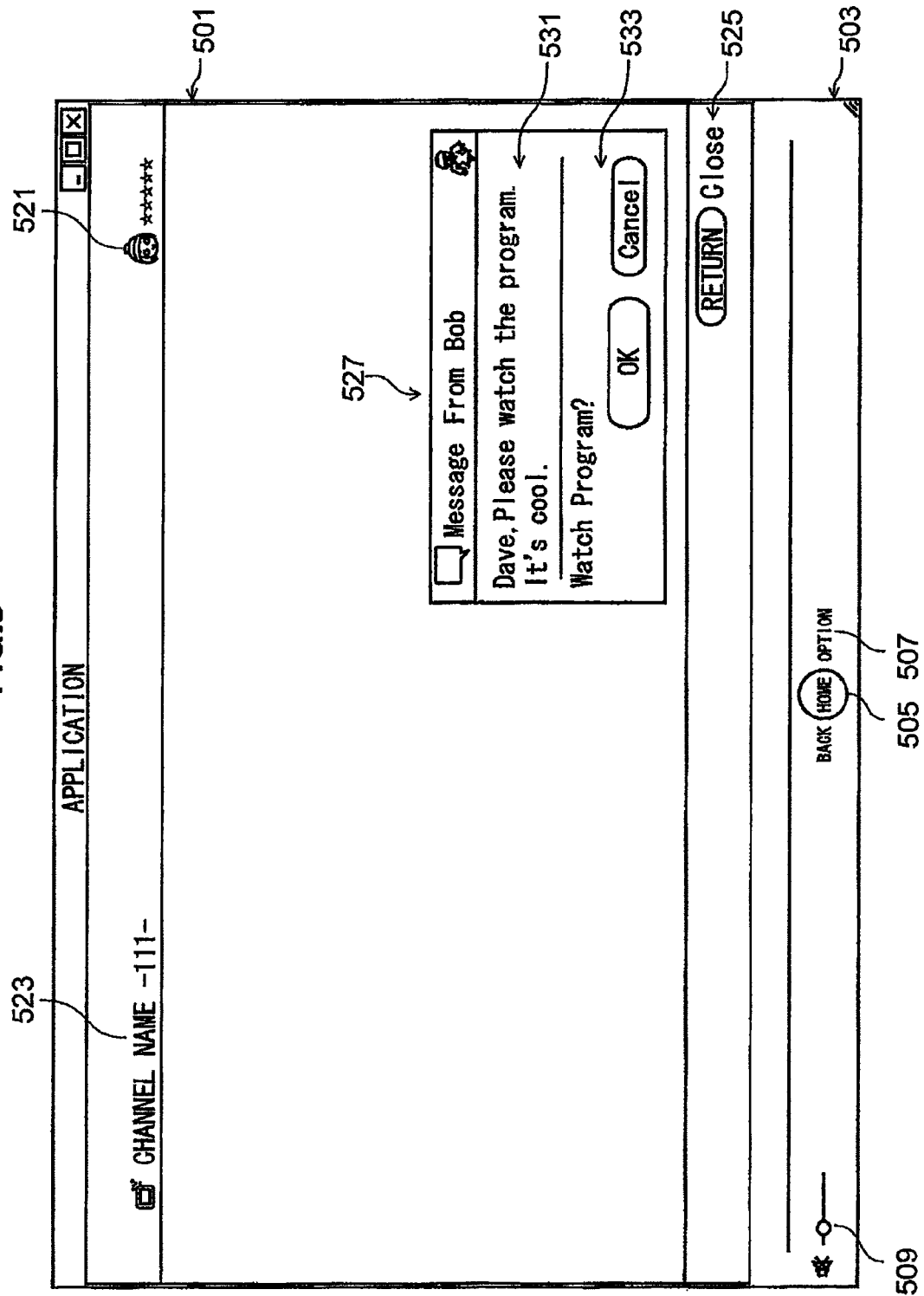
FIG. 5 is an explanatory diagram for explaining the example of the application for use in the information processing unit according to the embodiment.

If display of the received message is selected, the received message is displayed in the message display region 531 as shown in FIG. 5. If the received message has information for recommending watching or listening of a content which a sender of that message is watching or listening, a message for confirming whether or not the content which the sender of that message is watching or listening to and an object for executing a switch operation are displayed in a content switching operation object display region 533.

The message display region 531 and content switching operation object display region 533 are disposed within the information display region 501 so that its portion concealing the content of the content displayed in the information display region 501 is as small as possible.

Figure 6:
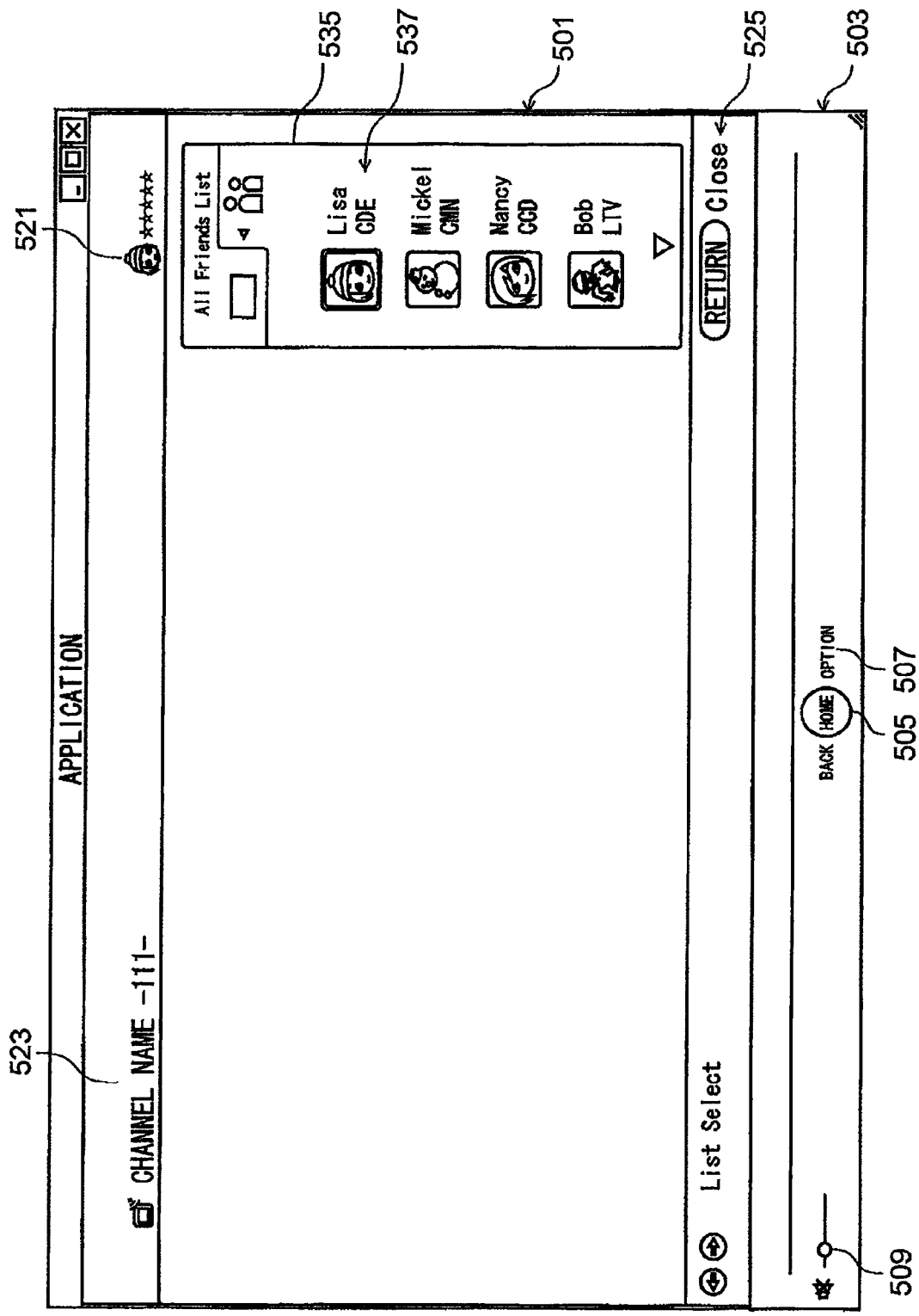
FIG. 6 is an explanatory diagram for explaining the example of the application for use in the information processing unit according to the embodiment.

In the application according to this embodiment, by setting information (for example, friend's user ID, address of client device used by the friend, and the like) about friends of the user of the information processing unit 300 preliminarily, whether or not the friend is connected to the content providing server 100 can be determined. More specifically, as shown in FIG. 6, the information display region 501 is provided with a registered ID connecting state display region 535 so as to reduce a portion concealing the content of a content being watched or listened, and objects 537 expressing preliminarily registered friends and friends' ID names are displayed such that they are correlated in this registered ID connecting state display region 535 as "All Friends List". At this time, by changing an object (for example, avatar or the like) about user connected to the content providing server 100 and the display method of the object about not-connected user, user of an information processing unit 300 can grasp friend's connecting state. For example, by changing the color and the size of the line which surrounds the object 537, changing the transparency of the object 537 or blinking the object 537, user of the information processing unit 300 can grasp the connecting state of friend user visually.

Figure 7:
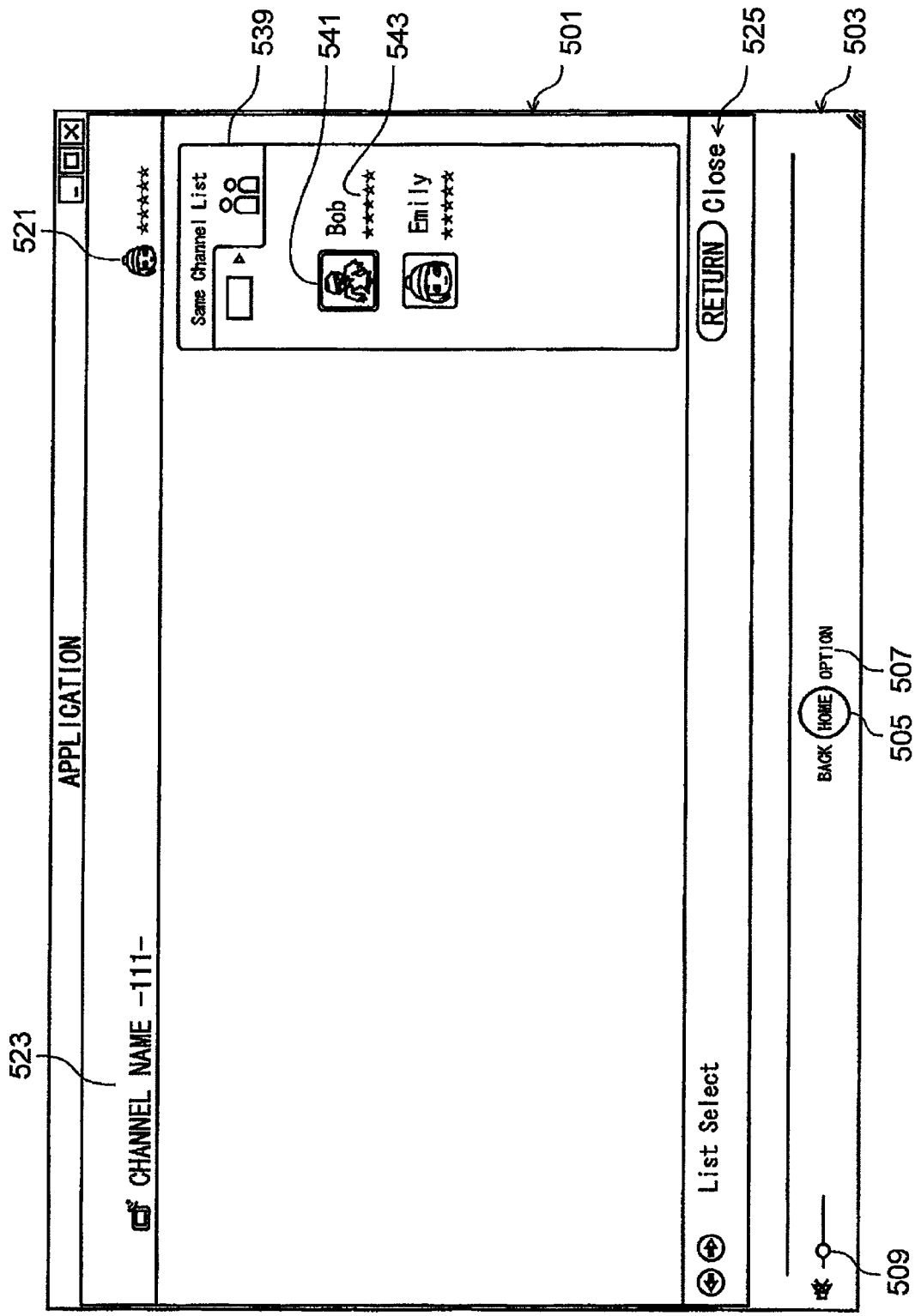
FIG. 7 is an explanatory diagram for explaining the example of the application for use in the information processing unit according to the embodiment.
Figure 8:
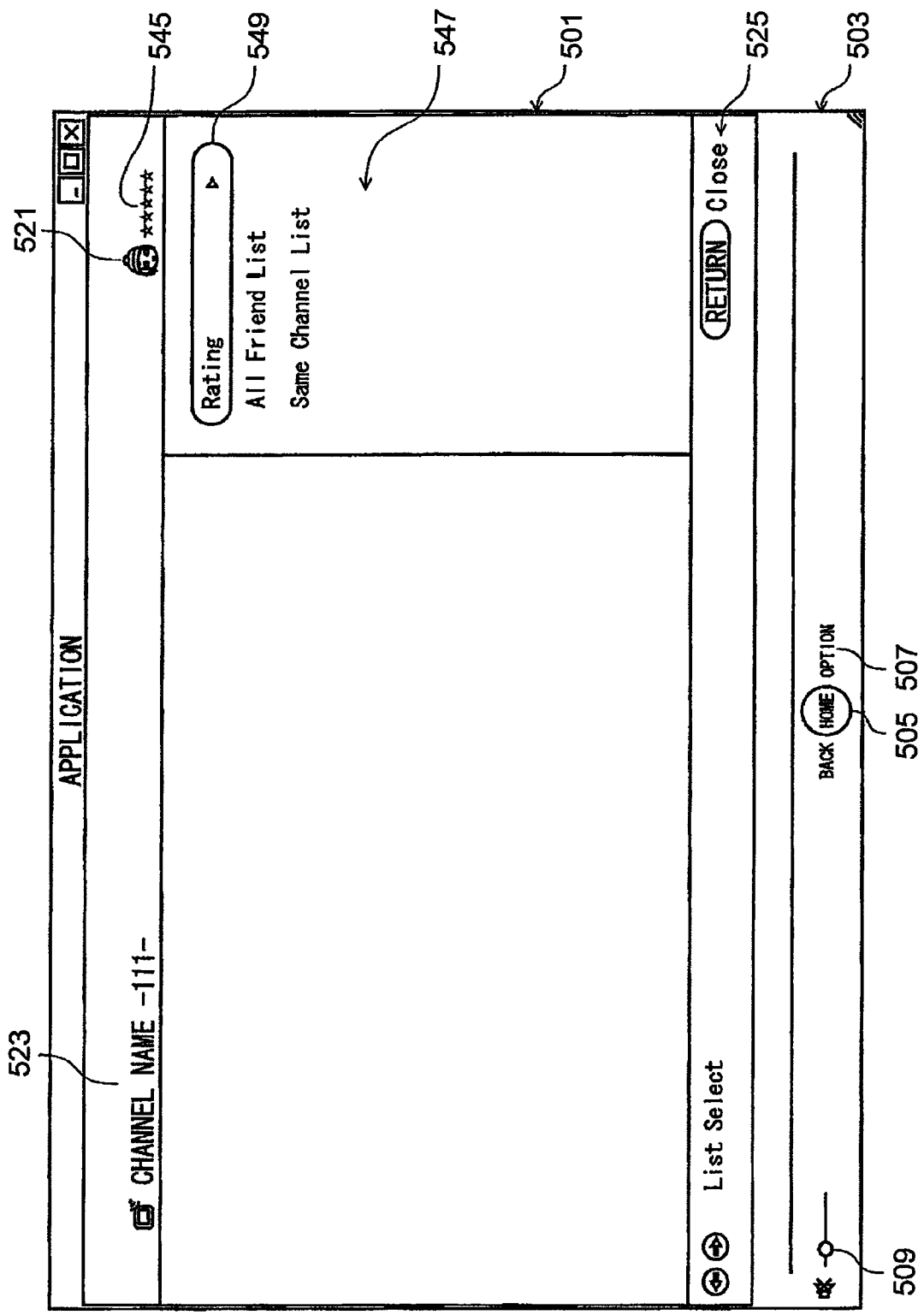
FIG. 8 is an explanatory diagram for explaining the example of the application for use in the information processing unit according to the embodiment.

In the application according to this embodiment, a list of other users who watch or listen to the same content as the content which the user of the information processing unit 300 watches or listens to, can be also displayed. As shown in FIG. 7, a same content viewer display region 539 is provided in the information display region 501 so that a portion concealing the content of a content being watched or listened to is minimized and an object (avatar) 541 of user who watches or listens to the same content is displayed in correlation with user name as "Same Channel List" in the same content viewer display region 539. Further, an evaluation 543 which is performed on any content which the user is watching or listening to is displayed in the object 541 of the user. Although in the example shown in FIG. 7, the evaluation of user is expressed as the number of stars, this embodiment is not limited to the example shown in the same Figure but the evaluation may be expressed in count or using predetermined keywords such as "good", "normal" and "bad".

The evaluation on any content being watched or listened to can be performed by the user of the information processing unit 300 also. The evaluation 545 to a content being watched or listened to is expressed as the number of starts such that it adjoins the icon (avatar) 521 indicating user. To change this evaluation, for example, the "OPTION" icon 507 displayed in the operation object display region 503 is selected and an option operation selecting region 547 is displayed in the information display region 501. Subsequently, the evaluation is carried out by selecting an object ("Rating" icon) 549 for evaluation from the option operation information displayed in the option operation selecting region 547.

Figure 9:
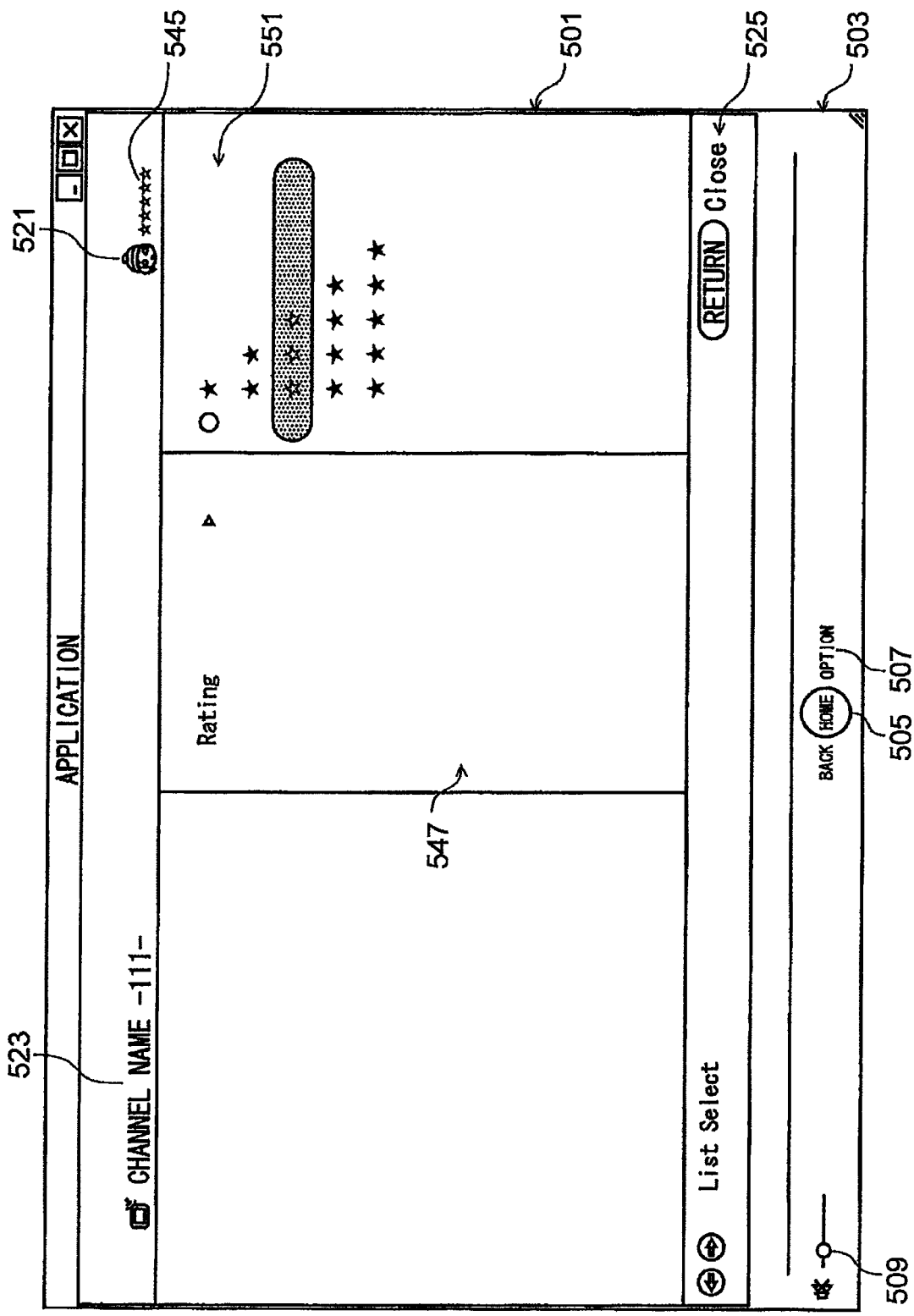
FIG. 9 is an explanatory diagram for explaining the example of the application for use in the information processing unit according to the embodiment.
Figure 10:
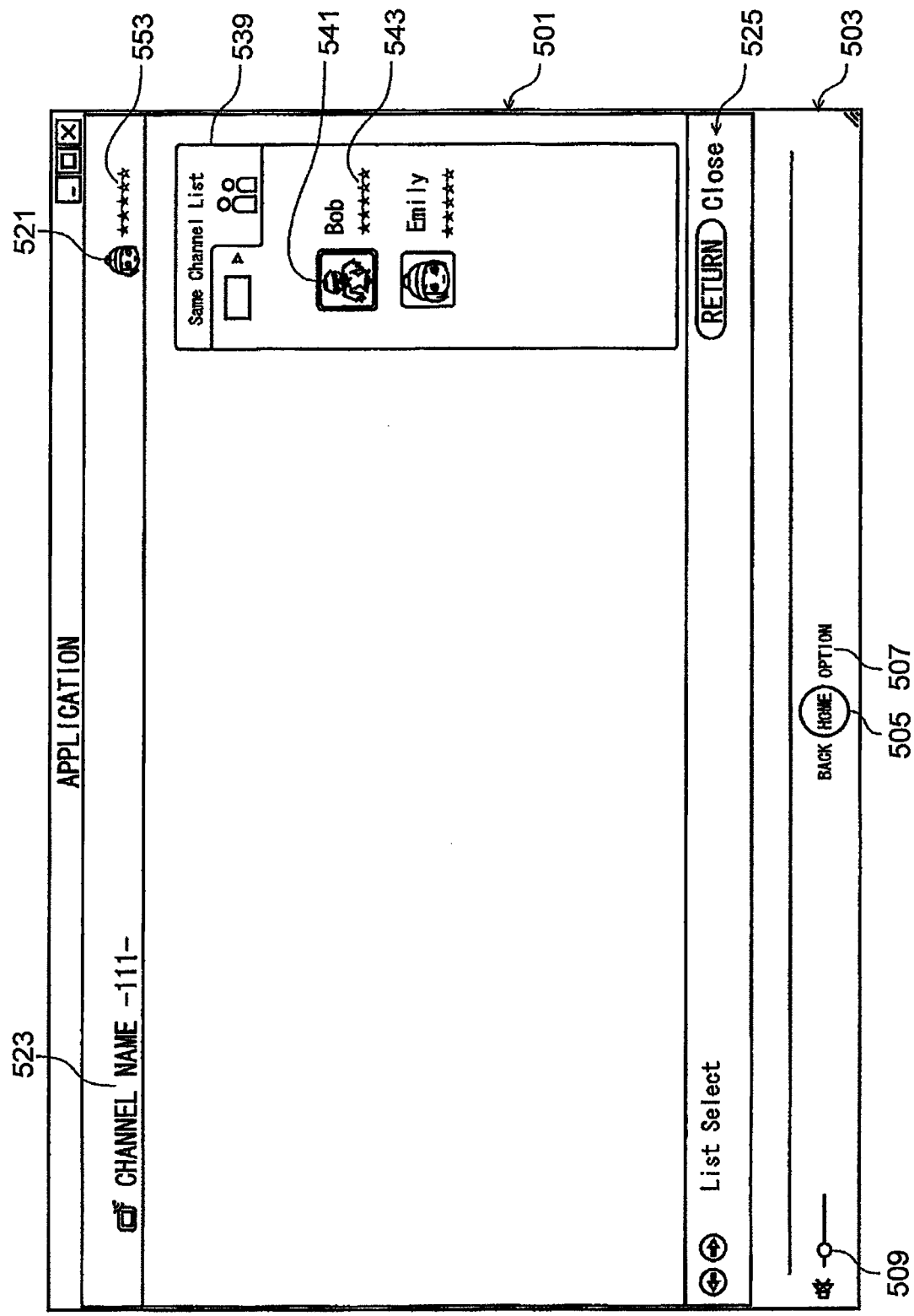
FIG. 10 is an explanatory diagram for explaining the example of the application for use in the information processing unit according to the embodiment.

When the "Rating" icon 549 is selected, an evaluation selecting region 551 is displayed adjacent to the option operation selecting region 547 as shown in FIG. 9. By selecting an evaluation content displayed in the evaluation selecting region 551, the content being watched or listened can be evaluated. When the evaluation content is selected, the evaluation 553 adjacent to the icon (avatar) 521 expressing user is changed as shown in FIG. 10.

Figure 11:
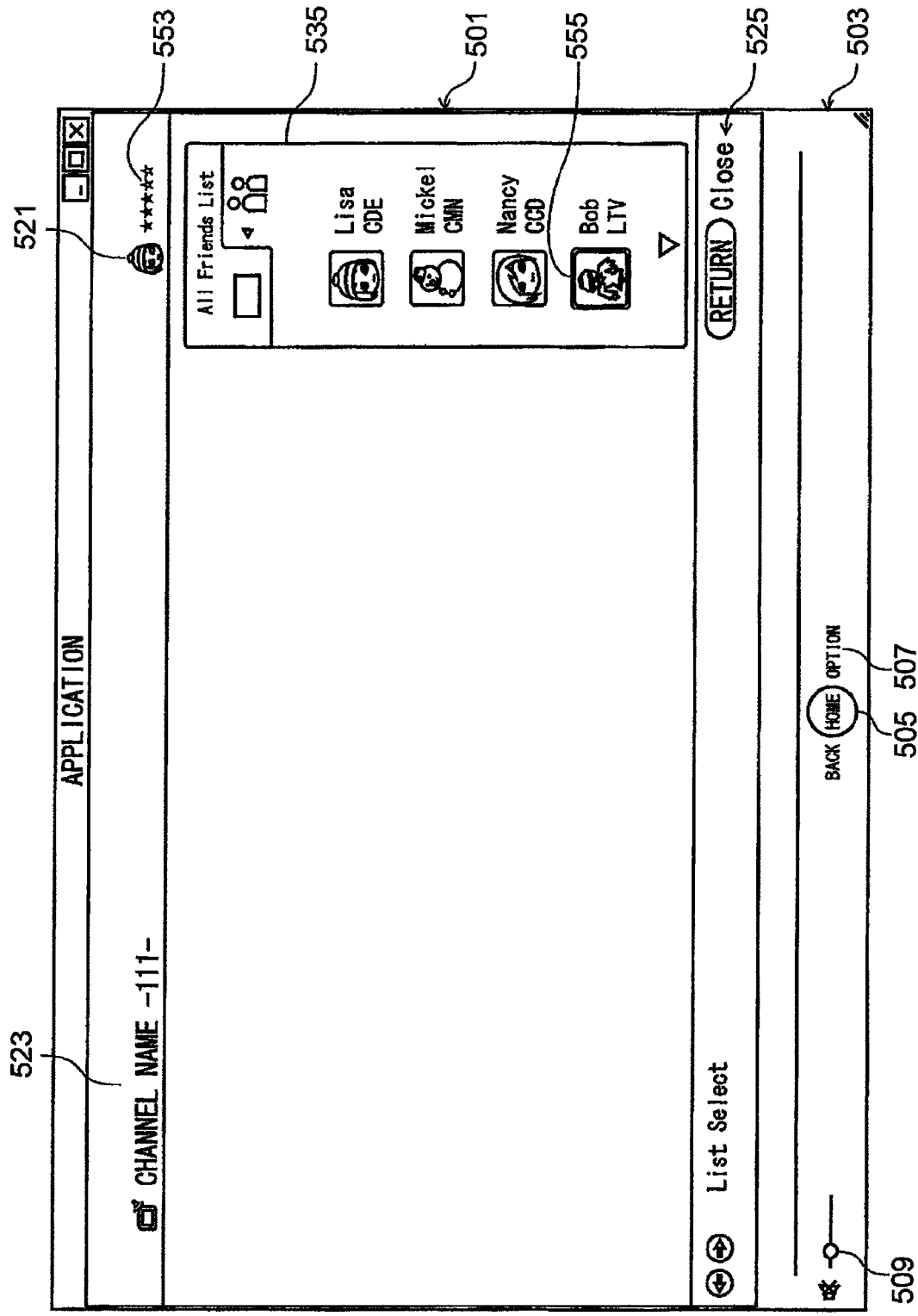
FIG. 11 is an explanatory diagram for explaining the example of the application for use in the information processing unit according to the embodiment.
Figure 12:
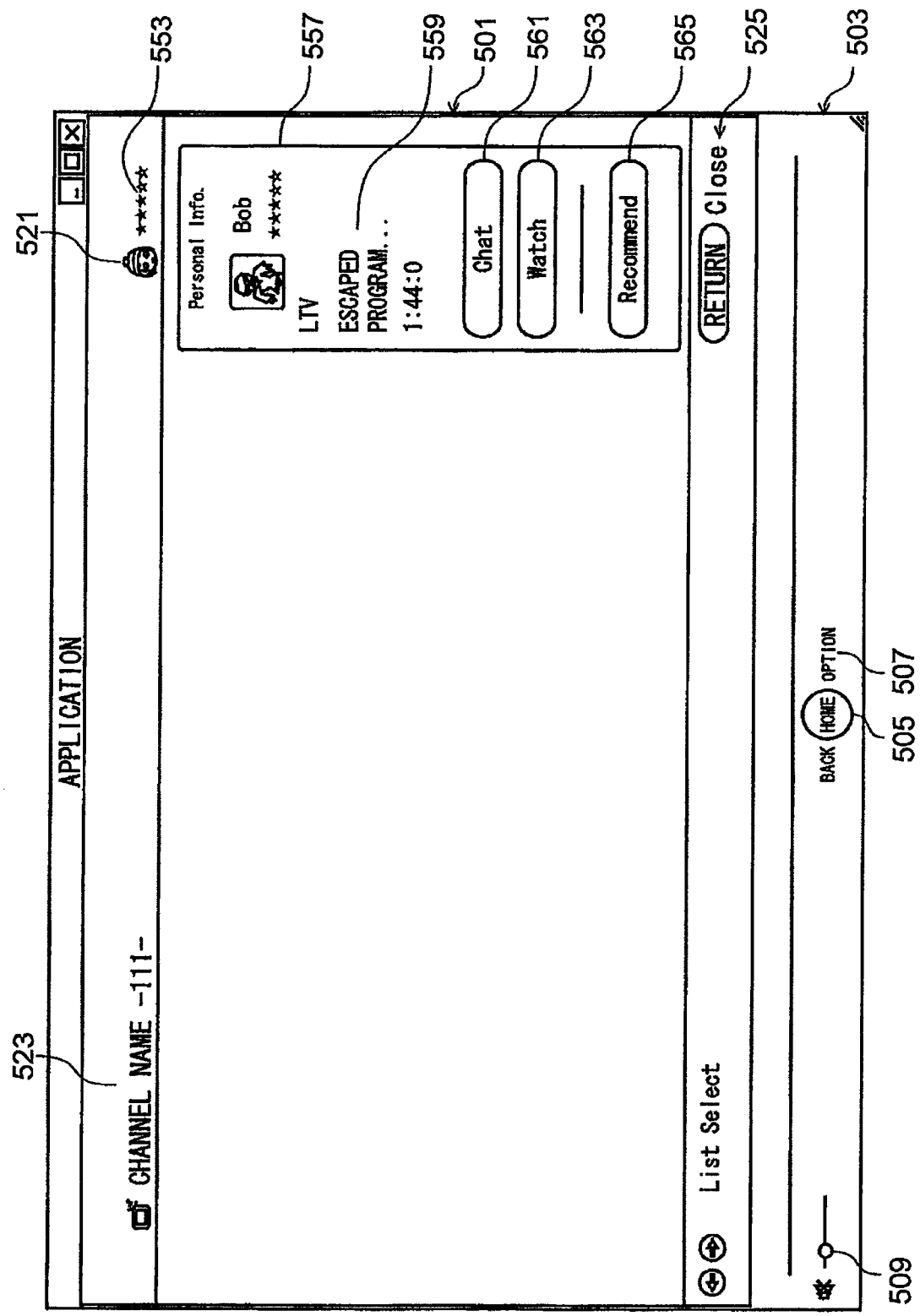
FIG. 12 is an explanatory diagram for explaining the example of the application for use in the information processing unit according to the embodiment.

In the application according to this embodiment, detailed information about users can be referred using the other client devices 14. If an object (avatar) 555 expressing user indicated in the registered ID connecting state display region 535 (for example, "All Friends List") or the same content viewer display region 539 (for example, "Same Channel List") is selected as shown in FIG. 11, a user information display region 557 is displayed in the information display region 501 as shown in FIG. 12. Information 559 about a content which user watches or listens to currently is displayed in this user information display region 557 as well as the object expressing the user. In the user information display region 557, an object 561 ("Chat" icon) for executing bidirectional communication such as chat with user whose information is expressed and an object ("Watch" icon) 563 for watching or listening to a content which the user whose information is expressed watches or listens to are displayed. Further, an object ("Recommend" icon) 565 for recommending the content watched or listened to by user of the information processing unit 300 to the user whose information is expressed is displayed.

Figure 13:
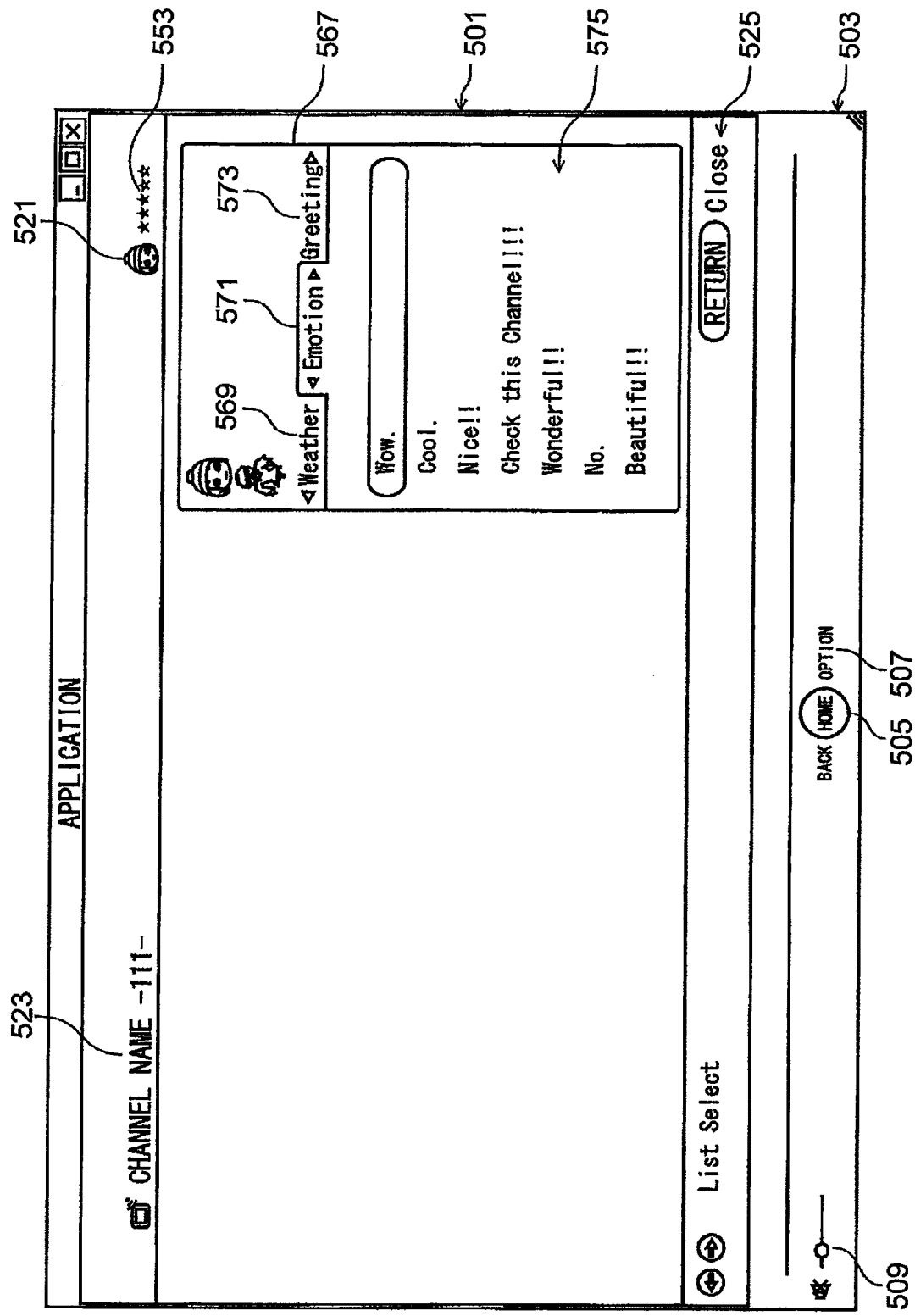
FIG. 13 is an explanatory diagram for explaining the example of the application for use in the information processing unit according to the embodiment.

If user of the information processing unit 300 selects the "Chat" icon 561, a message selecting region 567 is displayed in the information display region 501 instead of the user information display region 557 as shown in FIG. 13. In the message selecting region 567, ordinarily used conversation sentences such as tags which collect sentences about the weather ("Weather" tag) 569, tags ("Emotion" tag) 571 which collect sentences about sentiment, tags ("Greeting" tag) 573 which collect expressions about greeting and the like are set up preliminarily for each topic and by selecting sentences 575 which are accommodated in the tags, the bidirectional communication with a specific user such as chat can be carried out.

Such an application is stored in a read only memory (ROM) or random access memory (RAM) or the like of a memory portion provided on the information processing unit 300 and read into a central processing unit (CPU) provided on the information processing unit 300 and executed. Such an application may be stored in a volatile memory provided in the information processing unit 300 or a volatile memory connected to the information processing unit 300. In the meantime, any recording medium in which the application is recorded and can be read by computer may be provided. As the recording medium, for example, a magnetic disk, optical disk, a magneto-optical disk, a flash memory and the like are available. Further, the aforementioned application may be distributed through a network without using any recording medium.

<Content Providing Server According to this Embodiment>

Figure 14:
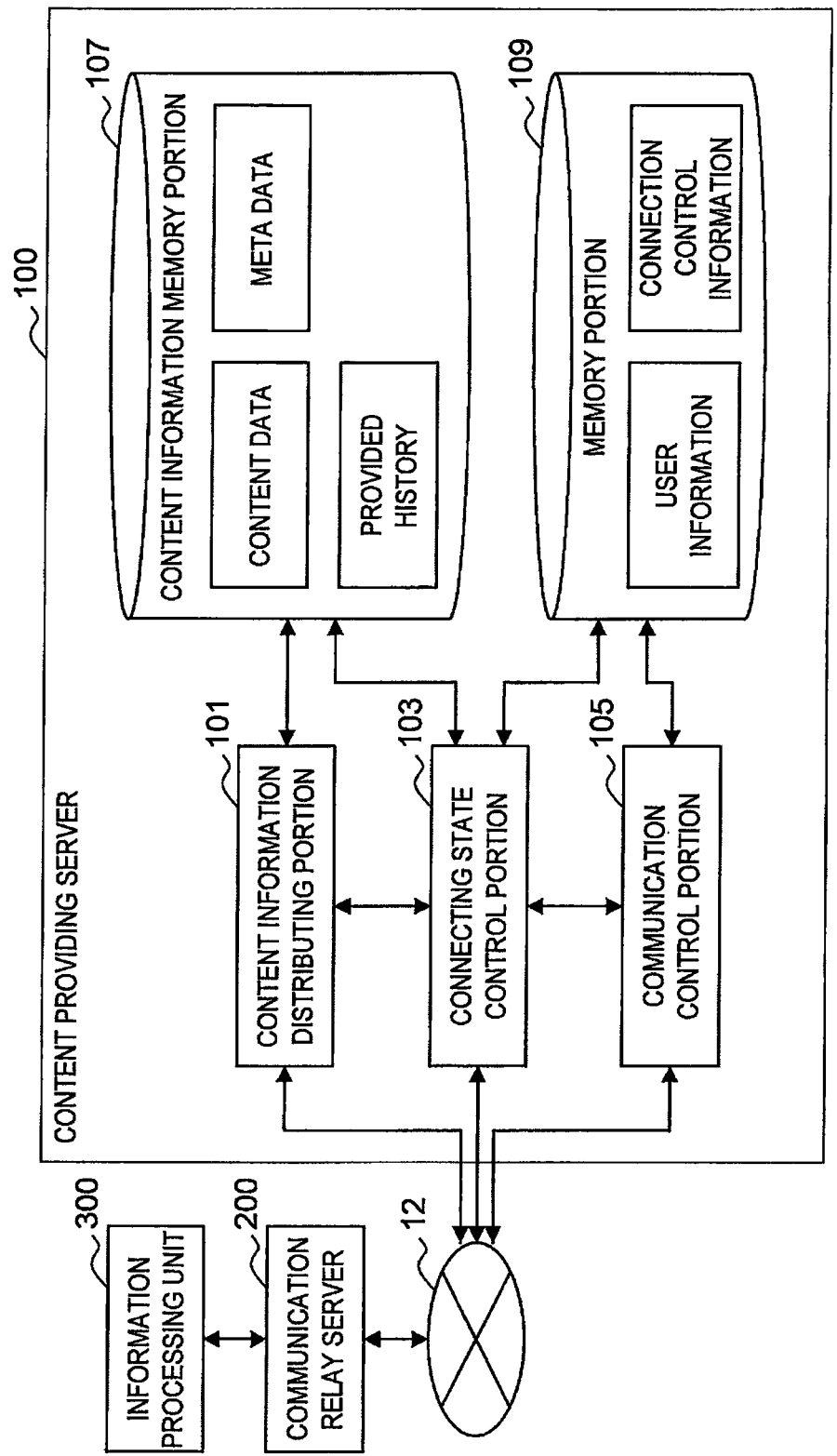
FIG. 14 is a block diagram for explaining functions of the content providing server according to the embodiment.

Next, the content providing server 100 of this embodiment will be described in detail with reference to FIG. 14. FIG. 14 is a block diagram for explaining the function of the content providing server 100 according to this embodiment.

As shown in FIG. 14, the content providing server 100 according to this embodiment includes mainly a content information distribution portion 101, a connecting state control portion 103, a communication control portion 105, a content information memory portion 107, and a memory portion 109.

The content information distribution portion 101 is constituted of for example, CPU, ROM, RAM, communication unit and the like and corresponding to a request from the information processing unit 300, distributes content information including content data recorded in the content information recording portion 107 and meta data of content corresponding to the content data to the information processing unit 200. The content information distribution portion 101 may acquire content data from outside of the content providing server 100 and distribute the acquired content data to the information processing unit 200. The content information distribution portion 101 may distribute only meta data to the information processing unit 200 or may distribute both the meta data and the content data to the information processing unit 200. In the meantime, the detail of the meta data which the content information distribution portion 101 distributes to the information processing unit 200 will be described in detail below.

The meta data of the content contains for example, location information indicating the location of the content and attribute information relating to the content of a content. As the location information indicating a location of a content, for example, ID for controlling the content, content uniform resource identifier (URI) and the like can be mentioned. As the attribute information about the content of a content, for example, description information about the content of a content, rating information about presence/absence of R-rating, information about an episode number, for example, to which episode a given content constituted of some episodes belong, a time required for reproduction of the content, a category of the content and the like can be mentioned.

The content information distribution portion 101 may send the content information about the content data and meta data based on information, transmitted from the connecting state control portion 103 described later, about the information processing unit 300 and the client devices 14 connected to the content providing server 100.

The content information distribution portion 101 may record the history of providing the content to the information processing unit 300 and the client device 14 in the content information memory portion 107 described later, based on a distribution result of the content and information expressing a connecting state transmitted from the connecting state control portion 103. As for the content providing history, the providing history of each of the specified information processing unit 300 and the client device 14 may be recorded in correlation with a providing date and statistical data such as a total number of contents provided by the content providing server 100 and a number of contents provided in each time may be recorded.

The connecting state control portion 103 is constituted of, for example, CPU, ROM, RAM, communication unit and the like so as to control the kind, quantity and address of the information processing unit 300 connected to the content providing server 100 and the client devices 14. The connecting state control portion 103 may record connection control information relating to the connected information processing unit 300 or the like in the memory portion 109 described later or a buffer (not shown) as a database described later. Further, the connecting state control portion 103 may transmit connection control information relating to the other information processing unit 300 connected to the content providing server 100 and the client devices 14.

The communication control portion 105 is constituted of for example, CPU, ROM, RAM, communication unit and the like, so as to control bidirectional communication such as chat between the information processing unit 300 connected to the content providing server 100 and the client device 14. The communication control portion 105 controls such bidirectional communication based on user information and connection information recorded, for example, in the memory portion 109.

For example, content data relating to a content controlled by the content providing server 100, meta data containing information indicating presence/absence of a thumbnail of the content corresponding to the content data and a preview of the content, and content provision history are recorded in the content information memory portion 107. The content information memory portion 107 can appropriately memorize various parameters and a process of processing, which are required to be stored when some processing relating to distribution of the content information is carried out. The content information distribution portion 101 and the connecting state control portion 103 can make reading/writing freely to the content information memory portion 107.

User information and connection control information about the information processing unit 300 and client devices 14 connected to the content providing server 100 are recorded in the memory portion 109. Further, various parameters and database which the communication control portions 105 uses for controlling the bidirectional communication such as chat may be recorded in the memory portion 109 as well as these user information and connection control information. Further, various parameters and a process of the processing, which are required to be stored when some processing is carried out, may be memorized appropriately in addition to the above-mentioned information. The content information distribution portion 101, the connection state control portion 103, and the communication control portion 105 can make reading and writing freely to the memory portion 109.

An example of the function of the content providing serer 100 according to this embodiment has been described above. Each component may be constructed using a general purpose member and circuit or of a hardware specified for each of the components. Further, the function of each component may be carried out by CPU or the like. Therefore, the construction for use may be changed appropriately corresponding to each technical level which implements this embodiment.

<Example of Meta Data>

Subsequently, an example of meta data which the content information distribution portion 101 according to this embodiment sends to the information processing unit 300 will be described in detail with reference to FIG. 15. FIG. 15 is an explanatory diagram for explaining an example of meta data which the content information distribution portion 101 according to this embodiment sends.

The meta data which the content information distribution portion 101 according to this embodiment sends to the information processing unit 300 includes, as shown in FIG. 15 for example, title 601 of a content, description 603 which is a brief explanation of the content of a content, rating 605 which describes the level of R-rating, evaluation 607 on the content, episode number 609 of the content, indicating, for example, which episode the content belongs to, content time 611, content category 613 and content URL 615 which is location information of the content.

The evaluation 607 on the content may be expressed by the number of stars as shown in FIG. 15, for example, or by parameters corresponding to the evaluation, that is, "good", "normal", "bad" or a mark point of the evaluation. In the category 613 of the content, as shown in FIG. 15, for example, the category itself may be described or parameter or the like corresponding to the category may be described.

The information processing unit 300 according to this embodiment described later can provide various information to user of the information processing unit 300 by using such meta data.

<Example of Connection Control Information>

Connection control information relating to the connecting state of an information processing unit generated by the connecting state control portion 103 according to this embodiment will be described in detail with reference to FIG. 16. FIG. 16 is an explanatory diagram for explaining the connection control information generated by the connecting state control portion 103 according to this embodiment.

The connection control information which the connecting state control portion 103 according to this embodiment generates includes, as shown in FIG. 16, user ID 701, connecting state 703, content watched/listened 705, friend user ID 707, friend user connecting state 709, and content watched/listened by friend user 711. The connection control information is summarized for each user ID 701 as shown in FIG. 16 and the content of that content is updated each time when data corresponding to each item is updated.

The connecting state control portion 103 according to this embodiment provides the connection control information corresponding to user ID of user of the information processing unit 300 to the information processing unit 300 connected to the content providing server 100. Thus, the information processing unit 300 which receives such connection control information can determine which the friend user is in on-line status or off-line status. Further, if the user is in the on-line status, the content which is watched or listened can be known.

The notation method of each item of the connection control information shown in FIG. 16 is a mere example and the notation method is not limited to this example.

<About Communication Relay Server According to this Embodiment>

Figure 17:
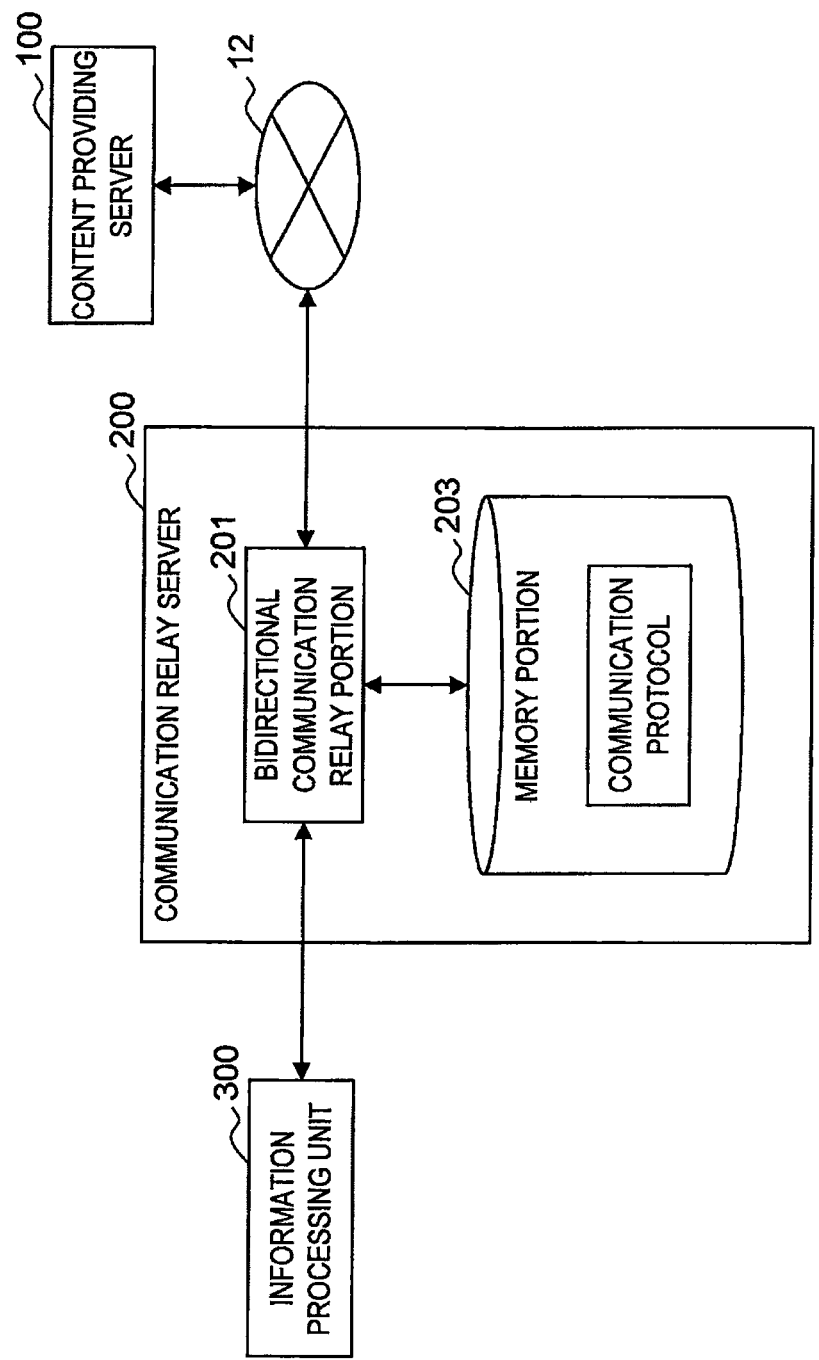
FIG. 17 is a block diagram for explaining a function of a communication relay server according to the embodiment.

Next, the communication relay server 200 according to this embodiment will be described in detail with reference to FIG. 17. FIG. 17 is a block diagram for explaining the function of the communication relay server 200 according to this embodiment.

The communication relay server 200 of this embodiment mainly includes a bidirectional communication relay portion 201 and a memory portion 203, as shown in FIG. 17.

The bidirectional communication relay portion 201 is constituted of for example, CPU, ROM, RAM, communication unit and the like, and determines communication information of communication content exchanged between the content providing server 100 and the information processing unit 300. If the communication information is information (for example, communication message, or the like) about chat carried out between the client device 14 connected to the content providing server 100 and the other information processing unit 300, the communication information is stored temporarily in the memory portion 203 described later.

More specifically, the bidirectional communication relay portion 201 analyzes the data type and data format of communication content exchanged between the content providing server 100 and the information processing unit 300 by referring to a communication protocol, or the like recorded in the memory portion 203 described later so as to determine which the communication content is communication information relating to the content information or communication information relating to the bidirectional communication such as chat, that is, a communication message. If it is found that the communication information is related to the content information as a result of the determining by the bidirectional communication relay portion 201, the bidirectional communication relay portion 201 sends the communication content to the content providing server 100 and the information processing unit 300 as it is. If it is found that the communication information is related to the bidirectional communication and it is sent from the information processing unit 300 to the content providing server 100 as a result of the determination, the bidirectional communication relay portion 201 sends the communication content to the content providing server 100 as it is.

On the other hand, if the communication information is related to the bidirectional communication and it is sent from the content providing server 100 to the information processing unit 300, the bidirectional communication relay portion 201 sorts the communication message which is communication information sent from the content providing server 100 for each sender with reference to the URL, user ID and the like of the sender described in the header of the communication information and records in the memory portion 203 temporarily. At this time, the bidirectional communication relay portion 201 may notify the information processing unit 300 that it has received a message from the other information processing unit 300 and the client devices 14 through the content providing server 100 or stand by without notifying from the communication relay server 200 until the information processing unit 300 confirms whether or not any message is received.

If the bidirectional communication relay portion 201 receives a notification which confirms whether or not any message has been received, sent from the information processing portion 300, the type of a message memorized temporarily in the memory portion 203 when the notification is received (that is, how many messages have been received from a person having what user ID) is sent back to the information processing unit 300. The information processing unit 300 specifies a message desired to be sent based on return information sent back from the bidirectional communication relay portion 201 and notifies the bidirectional communication relay portion 201 of a message sending request. The bidirectional communication relay portion 201 sends a given message to the information processing unit 300 based on the received message sending request.

Communication information or the like relating to bidirectional communication between the content providing server 100 and the information processing unit 300 is recorded in the memory portion 203. Various parameters, communication protocol and database which the bidirectional communication relay portion 201 uses in order to determine the content of the bidirectional communication such as chat are recorded in the memory portion 203. Further, various parameters and a process of processing which are required to be stored when the communication relay server 200 performs some processing can be memorized appropriately in addition to these information pieces. The bidirectional communication relay portion 201 can make reading/writing freely to the memory portion 203.

An example of the function of the communication relay server 200 according to this embodiment has been shown above. Each component may be constructed using a general purpose member and circuit or of a hardware specified for each of the components. Further, the function of each component may be carried out by CPU or the like. Therefore, the construction for use may be changed appropriately corresponding to each technical level which implements this embodiment.

<About Information Processing Unit According to this Embodiment>

Figure 18:
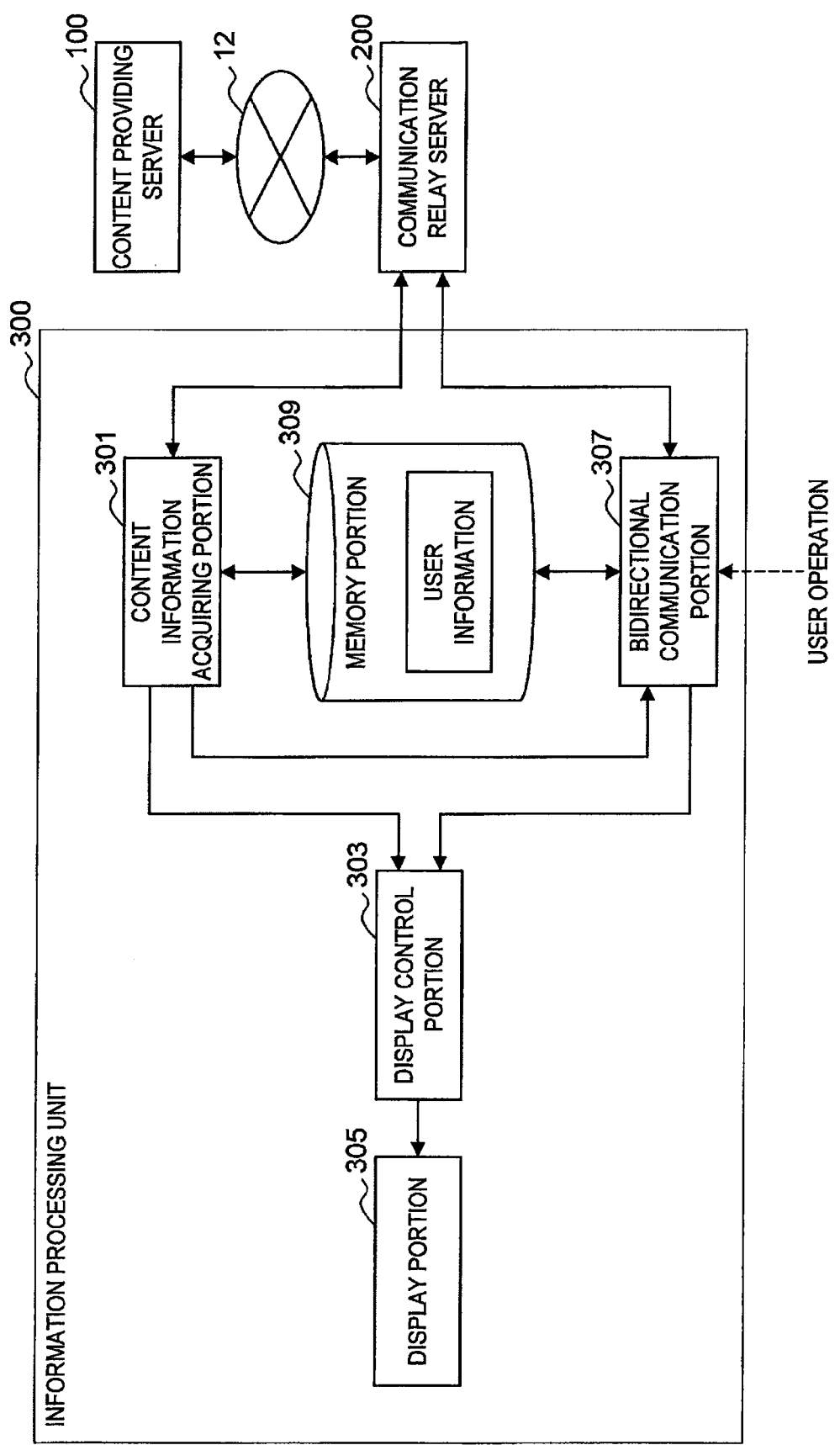
FIG. 18 is a block diagram for explaining the function of the information processing unit according to the embodiment.

Next, the information processing unit 300 according to this embodiment will be described in detail with reference to FIG. 18. FIG. 18 is a block diagram for explaining the function of the information processing unit 300 according to this embodiment.

The information processing unit 300 according to this embodiment mainly includes, as shown in FIG. 18 for example, a content information acquiring portion 301, a display control portion 303, a display portion 305, a bidirectional communication portion 307 and a memory portion 309.

The content information acquiring portion 301 is constituted of for example, CPU, ROM, RAM, communication unit and the like, and acquires content information including content data and meta data of a content corresponding to the content data from the content providing server 100. The content information acquiring portion 301 outputs the acquired content data to the display control portion 303 described later. Further, the content information acquiring portion 301 may record the acquired content data, meta data and the like in the memory portion 309 described later.

When the information processing unit 300 is connected to the content providing server 100 through the communication relay server 200 and the communication network 12, the content information acquiring portion 301 according to this embodiment sends an acquisition request for the meta data of the content to the content providing server 100. When the meta data is sent from the content providing server 100 corresponding to the acquisition request, the content information acquiring portion 301 receives the meta data and outputs to the display control portion 303.

The display control portion 303 is constituted of, for example, CPU, ROM, RAM and the like so as to control the display of the display portion 305 described later. The content data and meta data are inputted to the display control portion 303 from the content information acquiring portion 301 and the display control portion 303 executes the display control for displaying the inputted content data and meta data on the display portion 305. If the action of a position specifying object such as a mouse pointer and cursor is detected, the display control about the position specifying object is carried out corresponding to the detected action. Further, if the information processing unit 300 executes bidirectional communication such as chat with the other client device 14, communication result is inputted from the bidirectional communication portion 307 described later and the display control of the inputted communication result to the display portion 305 is carried out.

The display portion 305 is an output device having the information processing unit 300 according to this embodiment and for example, such a display unit as a CRT display unit, liquid crystal display unit, plasma display unit, EL display unit is used. Various pieces of displayed information displayed on the display portion 305 are controlled by the display control portion 303.

The bidirectional communication portion 307 is constituted of, for example, CPU, ROM, RAM, communication unit and the like so as to control bidirectional communication such as chat to be carried out between the information processing unit 300 according to this embodiment and the other client device 14 connected to the content providing server 100 through the communication relay server 200 and the communication network 12, while the content is reproduced in the display portion 305. Speaking further in detail, the bidirectional communication portion 307 controls the bidirectional communication with the other client device 14 carried out through the content providing server 100 based on user information and communication protocol recorded in the memory portion 309.

More specifically, the bidirectional communication portion 307 carries out bidirectional communication such as chat between the other information processing unit 300 and the client device 14 through the communication relay server 200 and the content providing server 100. At the time of this bidirectional communication, the bidirectional communication portion 307 changes the control method of the bidirectional communication corresponding to a processing content implemented by the information processing unit 300 (use condition of a display region of the information processing unit 300, use condition of a memory resource and the like).

If user of the information processing unit 300 gives an instruction of starting a chat with the client device 14A or a first communication message about start of the chat is received from the client device 14A when the bidirectional communication is not carried out while only reproduction of the content is executed as shown in FIG. 13, the bidirectional communication portion 307 starts the bidirectional communication with the client device 14A. When the first communication message is received from the client device 14A, the bidirectional communication portion 307 receives no communication message or information about user status or a change of user list except this first communication message. Further, in the bidirectional communication with the client device 14A, the bidirectional communication portion 307 periodically inquires the communication relay server 200 of whether or not a new communication message to the information processing unit 300 has been received.

If a return message saying that a new communication message exists and a total number of the received communication messages are received from the communication relay server 200 as a result of the inquiry, the bidirectional communication portion 307 receives a communication content of the only communication message sent from the client device 14A executing the bidirectional communication while not receiving a communication message sent from other devices than the client device 14A. Further, a total number of the communication messages received by the communication relay server 200 minus the number of the communication messages sent from the client device 14A may be displayed on the display portion 305 as the number of non-opened communication messages.

If connection control information as shown in FIG. 6 and FIG. 7 is displayed on the display portion 305, the bidirectional communication portion 307 acquires only a change in the displayed information about users (for example, change in connecting state, change of a channel watched or listened to) from the communication relay server 200 while not receiving any communication message in the bidirectional communication.

Reception processing of communication message by the bidirectional communication portion 307 will be described in detail below.

In the information processing unit 300 according to this embodiment, the bidirectional communication portion 307 changes the type of information acquired from the communication relay server 200 and the content providing server 100 corresponding to a display region of the information processing unit 300 and use condition of the I/O function or use condition of a memory resource. As a result, the information processing unit 300 according to this embodiment is capable of executing the bidirectional communication with plural external devices with convenience even if the display region, I/O function and memory resource of TV, portable phone, portable game machine, portable music player are insufficient.

User information relating to user of the information processing unit 300 is recorded in the memory portion 309. As well as these pieces of user information, various kinds of parameters, communication protocol and database which the bidirectional communication portion 307 uses to control the bidirectional communication such as chat may be recorded in the memory portion 309. Further, as well as these pieces of information, various parameters and a process of processing which are required to be stored when the information processing unit 300 performs some processing can be memorized appropriately. The content information acquiring portion 301, the display control portion 303, the display portion 305, the bidirectional communication portion 307 can make reading/writing freely to this memory portion 309.

The memory portion 309 records the applications described with reference to FIG. 2-FIG. 13 and various processings of the information processing unit 300 may be performed based on this application.

An example of the function of the information processing unit 300 according to this embodiment has been shown above. Each component may be constructed using a general purpose member and circuit or of a hardware specified for each of the components. Further, the function of each component may be carried out by CPU or the like. Therefore, the construction for use may be changed appropriately corresponding to each technical level which implements this embodiment.

About Bidirectional Communication According to this Embodiment>

Bidirectional communication carried out by the information processing unit 300 according to this embodiment will be described in detail with reference to FIG. 19-FIG. 25. FIGS. 19-25 are explanatory diagrams for explaining the bidirectional communication according to this embodiment.

Figure 19:
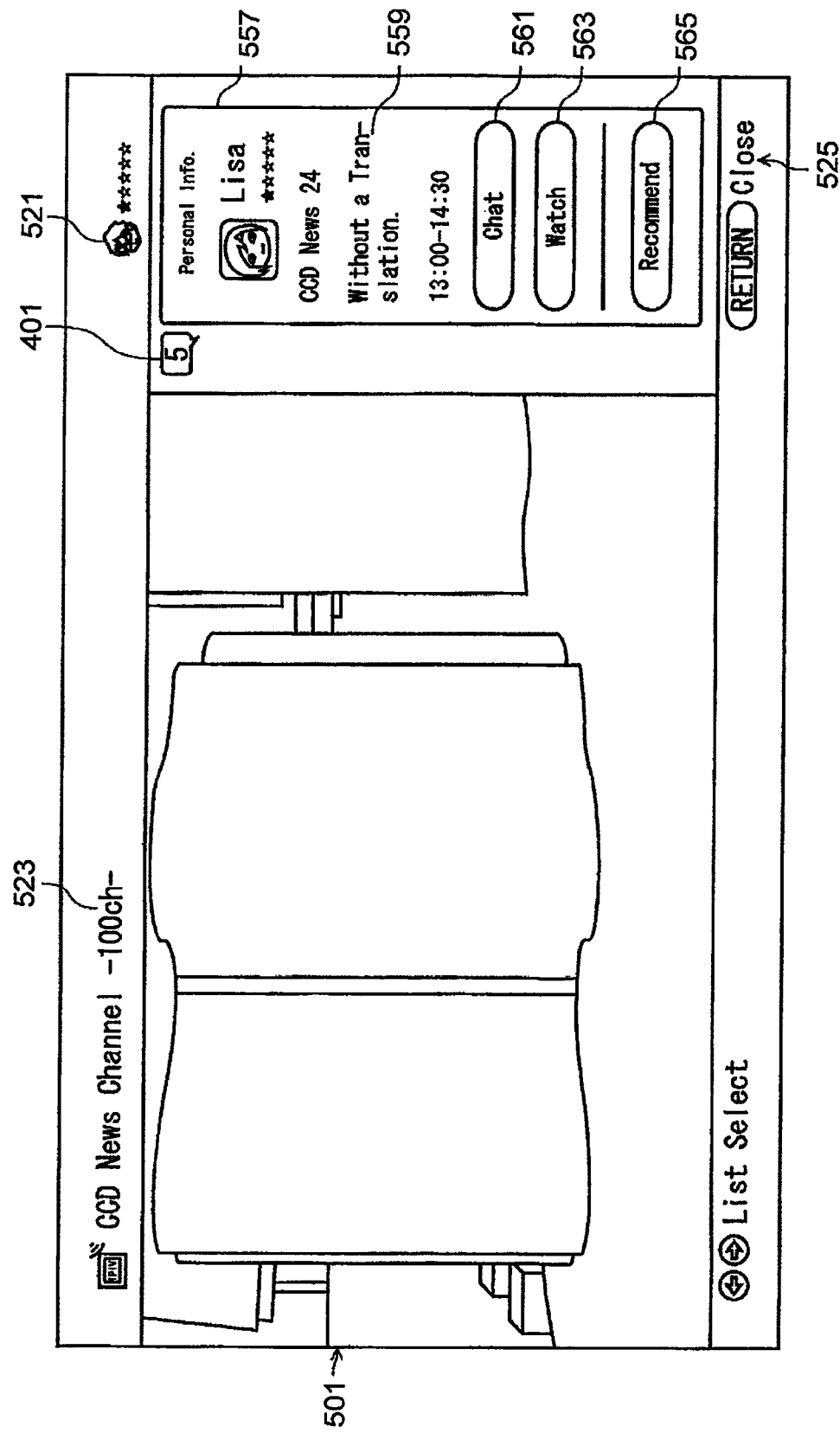
FIG. 19 is an explanatory diagram for explaining bidirectional communication executed by the information processing unit according to the embodiment.
Figure 20:
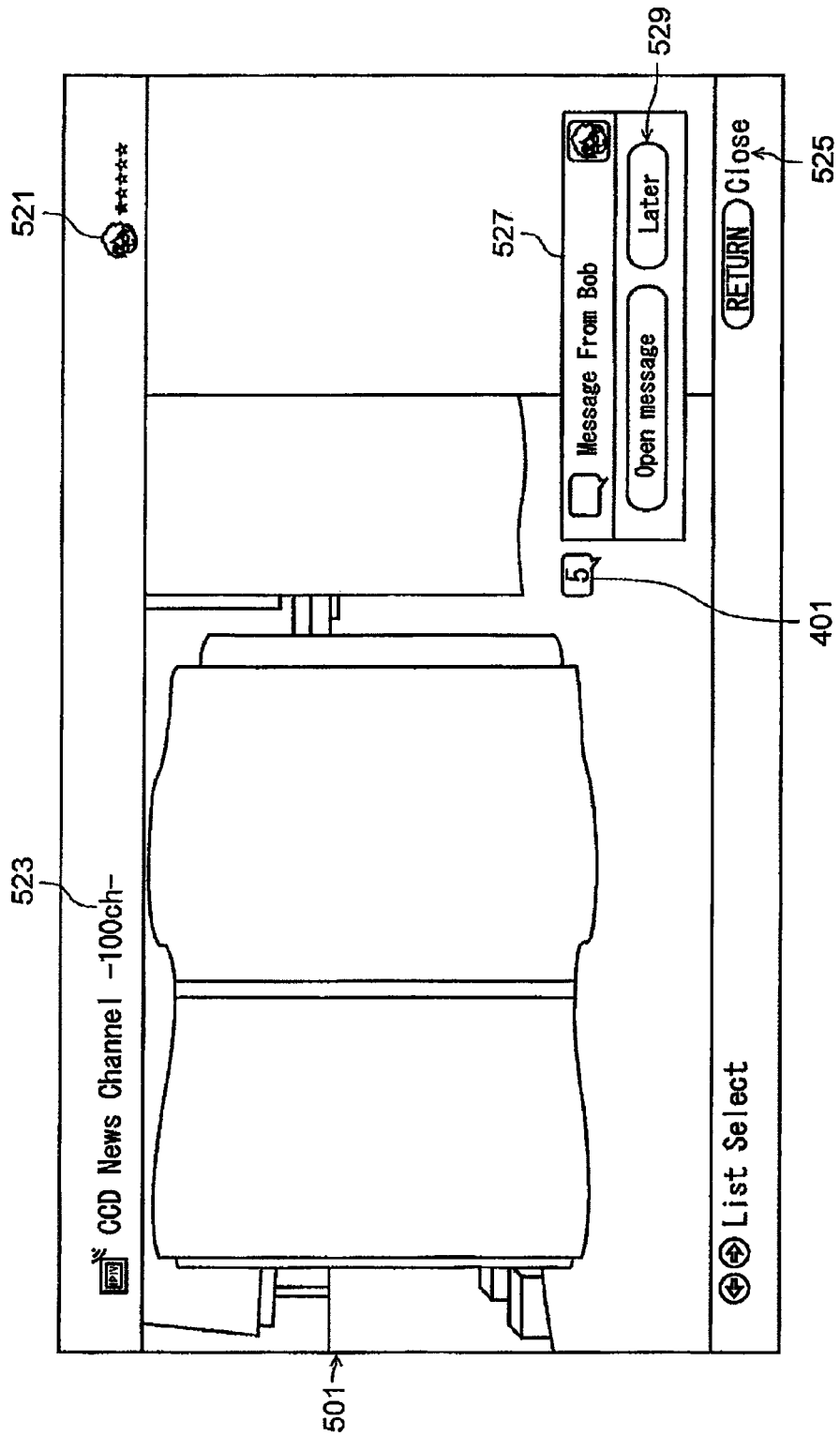
FIG. 20 is an explanatory diagram for explaining the bidirectional communication executed by the information processing unit according to the embodiment.
Figure 21:
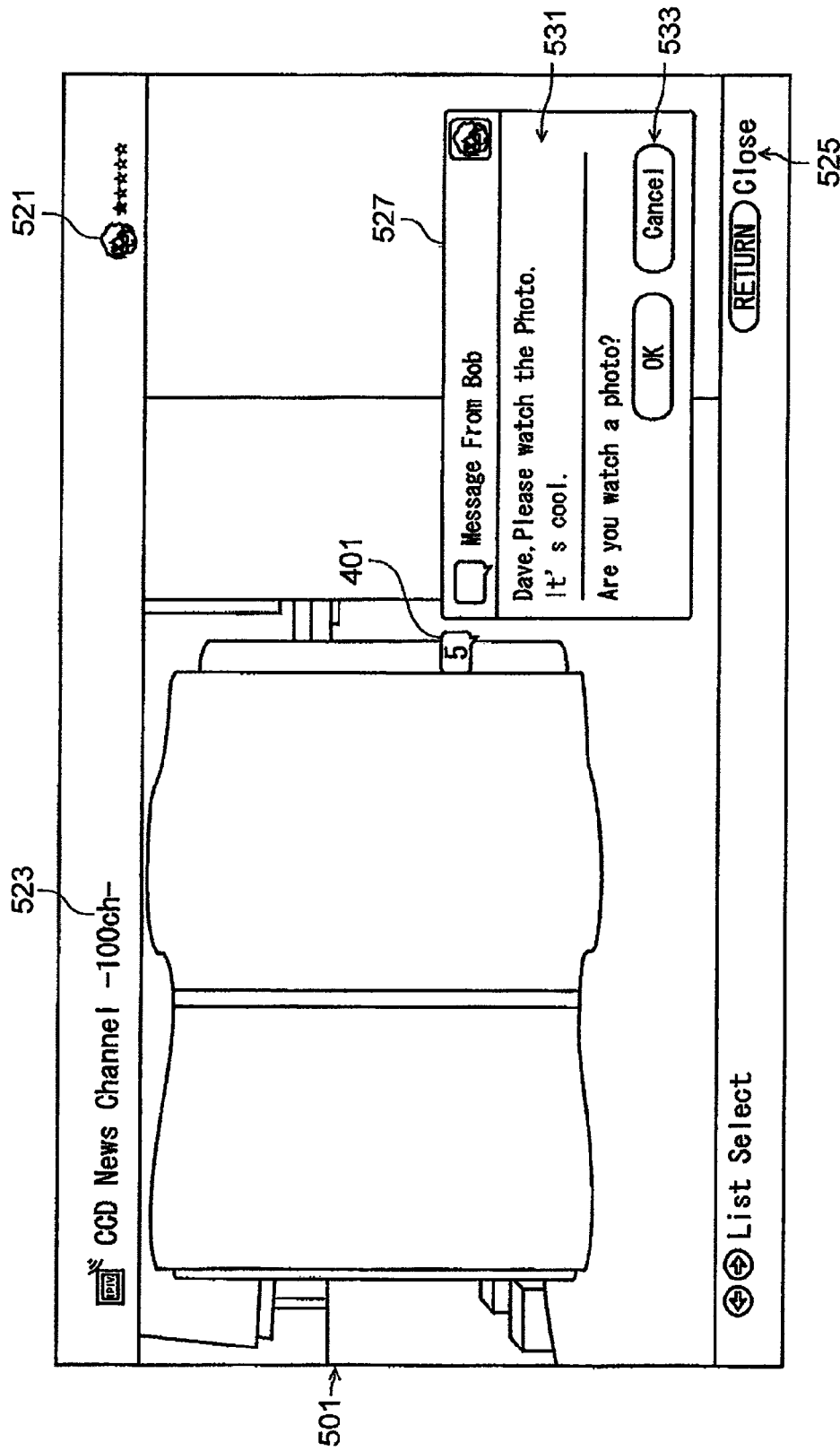
FIG. 21 is an explanatory diagram for explaining the bidirectional communication executed by the information processing unit according to the embodiment.

If the bidirectional communication portion 307 according to this embodiment is about to start chat with other pieces of user information displayed as shown in FIG. 19 or a first communication message meaning a start of the chat is received from the other client device 14A as shown in FIG. 20 and FIG. 21, it does not receive any communication message except the first received communication message and changes of user information but receive user information (for example, sender user ID and the like) relating to user who sends an non-opened communication message stored in the communication relay server 200 and a total number 401 of the non-opened communication messages. At this time, the total number 401 of the non-opened communication messages is displayed in the vicinity of various information display region developed in the information display region 501.

Figure 22:
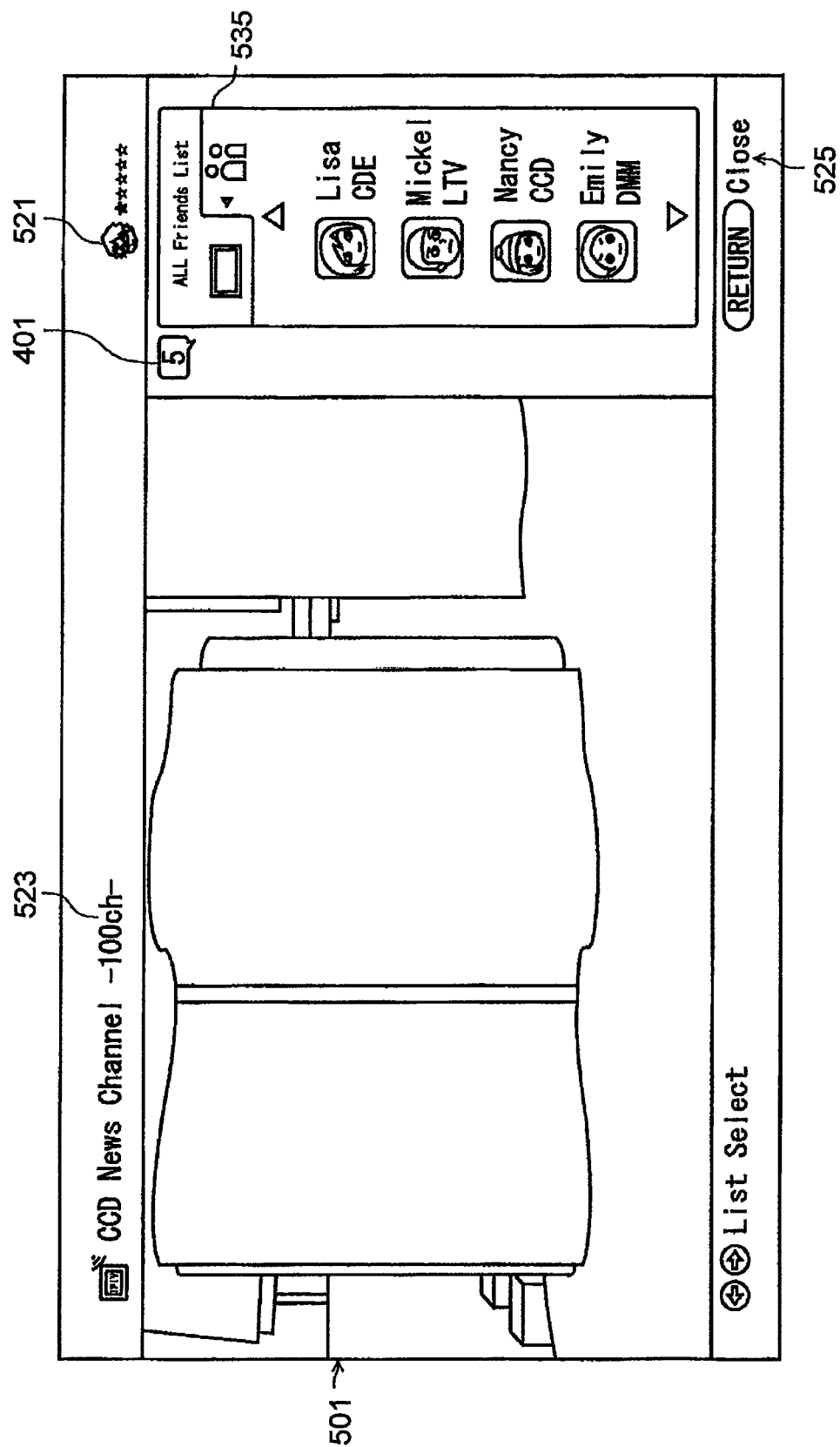
FIG. 22 is an explanatory diagram for explaining the bidirectional communication executed by the information processing unit according to the embodiment.
Figure 23:
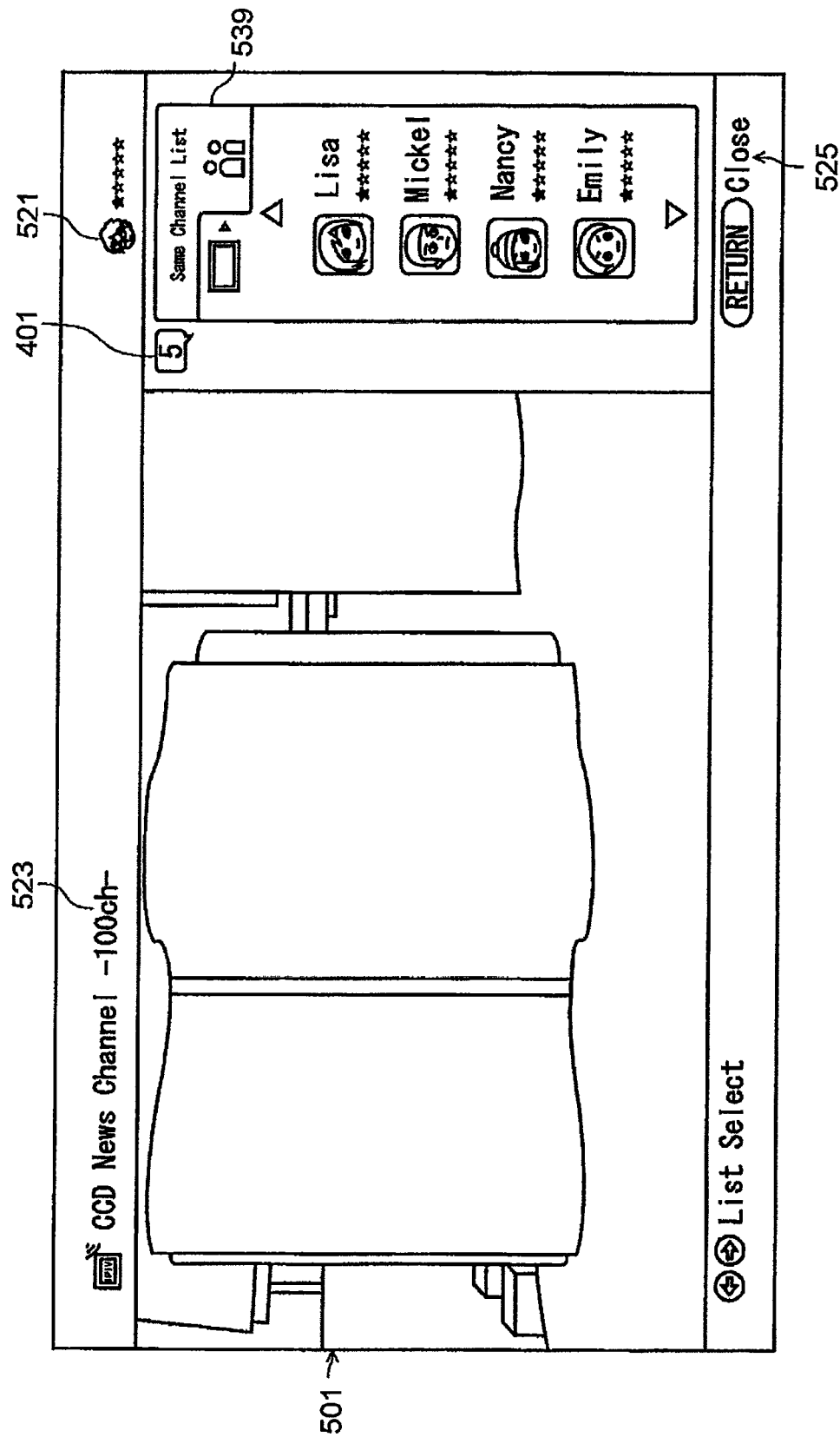
FIG. 23 is an explanatory diagram for explaining the bidirectional communication executed by the information processing unit according to the embodiment.

If as shown in FIG. 22 and FIG. 23, the registered ID connecting state display region 535 (for example, "All Friends List") or the same content viewer display region 539 (for example, "Same Channel List") are displayed in the information display region 501, the bidirectional communication portion 307 acquires only information about changes generated in the registered ID connecting state display region 535 and the same content viewer display region 539 from the communication relay server 200 and the content providing server 100 while acquiring no communication message. The total number 401 of the non-opened communication messages acquired from the communication relay server 200 is displayed in the vicinity of the registered ID connecting state display region 535 or the same content viewer display region 539.

Figure 24:
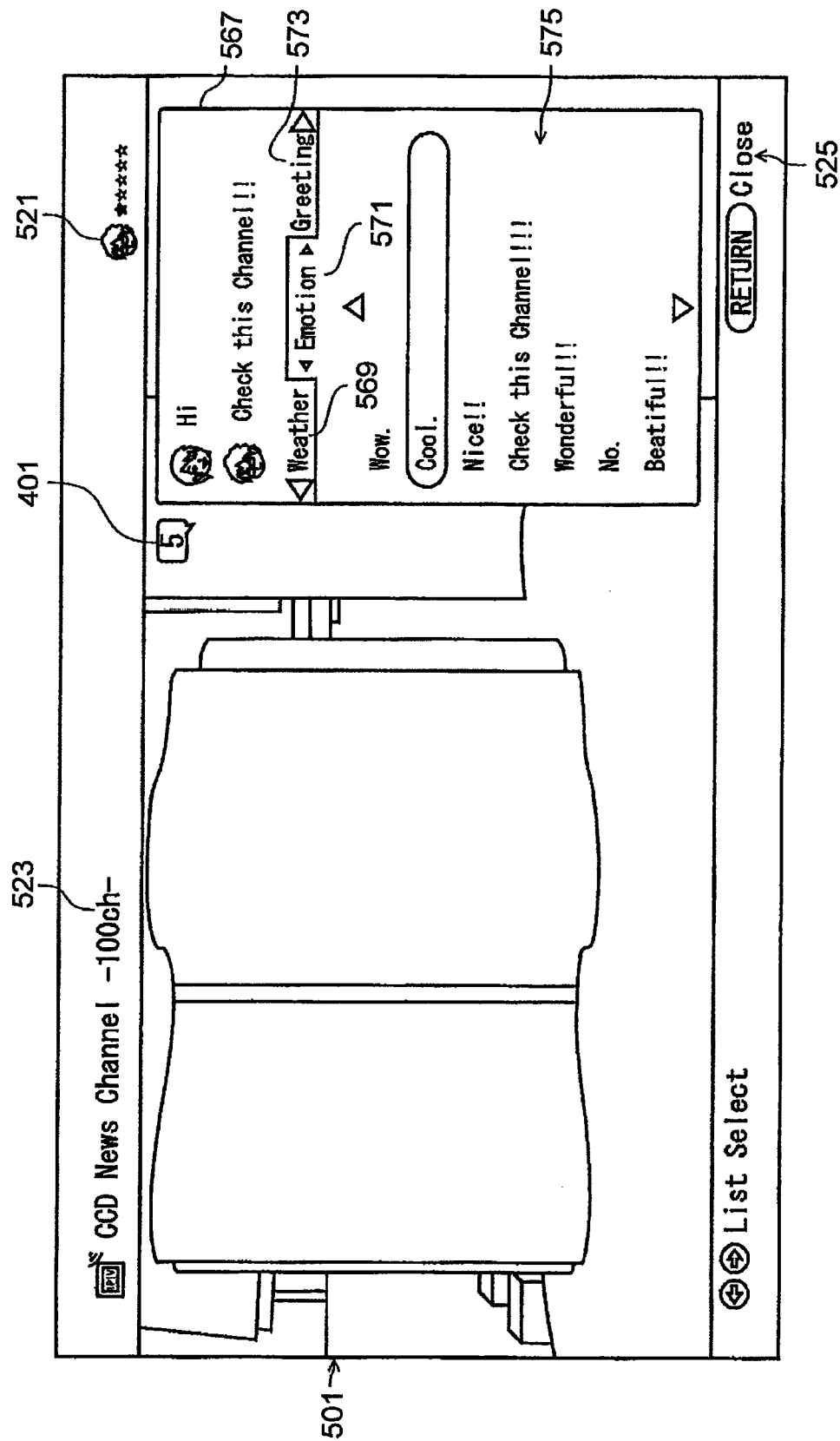
FIG. 24 is an explanatory diagram for explaining the bidirectional communication executed by the information processing unit according to the embodiment.

If as shown in FIG. 24, a user is chatting with a specified user (that is, specified client device), the bidirectional communication portion 307 acquires only a communication message sent from the client device which is executing the chat from the communication relay server 200 while not receiving any communication message or change of user information sent from other than the client device which is executing the chat. The bidirectional communication portion 307 displays the total number 401 of the non-opened communication messages acquired from the communication relay server 200 in the vicinity of the message selecting region 567.

The types of pieces of information which the bidirectional communication portion 307 acquires are summarized as shown in FIG. 25. As shown in FIG. 25, the bidirectional communication portion 307 according to this embodiment changes communication message acquired corresponding to the execution state of the bidirectional communication. Thus, even if the display region, I/O function and memory resource of the information processing unit 300 itself are insufficient, it can carry out bidirectional communication with plural external devices with the convenience.

<About Bidirectional Communication Method According to this Embodiment>

Figure 26A:
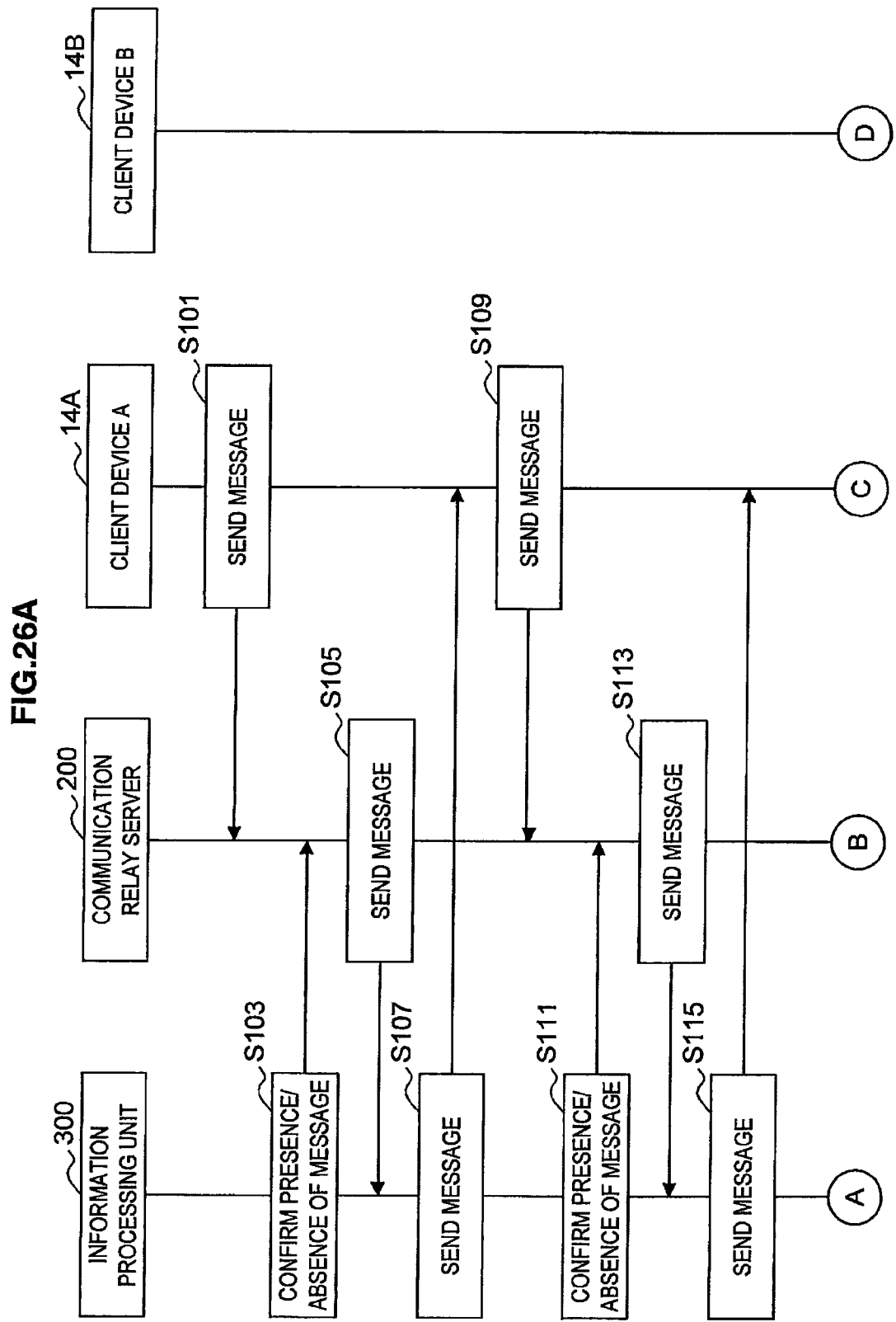
FIG. 26A is a flow chart for explaining the bidirectional communication method executed by the information processing unit according to the embodiment.

The method of the bidirectional communication performed in the information processing unit 300 according to this embodiment will be described in detail with reference to FIG. 26A and FIG. 26B. FIG. 26A and FIG. 26B are flow charts for explaining the bidirectional communication method according to this embodiment.

FIG. 26A and FIG. 26B show a processing executed when the information processing unit 300 receives a first communication message from a client device A when it is only reproducing content data (in other words, the bidirectional communication function is idled) and starts the chat with the client device A and a communication message is sent from a client device B during the chatting.

If the first communication message is sent from the client device A to the information processing unit 300 (step S101), the communication message is received by the communication relay server 200 which the information processing unit 300 is connected to. If an inquiry about whether or not any new communication message exists is sent from the information processing unit 300 (step S103), the communication relay server 200 sends the communication message sent from the client device A to the information processing device 300 (step S105). The information processing unit 300 sends back a message to the client device A in response to the received message (step S107), so as to achieve bidirectional communication between the client device A and the information processing unit 300.

If the client device A receives the communication message sent from the information processing unit 300, it sends back a return message in response to the received communication message (step S109). The information processing unit 300 sends an inquiry about whether or not any communication message has been received from the client device A to the communication relay server 200 (step S111) and the communication relay server 200 sends the communication message sent from the client device A to the information processing unit 300 (step S113). The information processing unit 300 sends back a return message to the client device A in response to the received message (step S115) and consequently, the bidirectional communication with the client device A is continued.

If a communication message is sent from the client device B which is not a chat mate to the information processing unit 300 (step S117), this message is received by the communication relay server 200 and a sender of the message is determined by the communication relay server 200. As a result, if it is found out that a message is sent from other device than the client device A which is executing the chat, the communication relay server 200 temporarily stores the communication message sent from the client device B (step S119). After that, if an inquiry about whether or not any communication message has been received from the client device A is sent from the information processing device 300 (step S121), the communication relay server 200 notifies the information processing unit 300 that the communication message is sent from the client device B while receiving no new communication message from the client A (step S123). At this time, the communication relay server 200 does not send the communication message sent from the client device B to the information processing unit 300.

After that, the information processing unit 300 terminates a chat session with the client device A (step S125) and inquires the communication relay server 200 of whether or not any new communication message exists (step S127). Because the information processing unit 300 is executing no bidirectional communication with any client device, the information processing unit 300 inquires whether or not the communication messages from all mates have arrived. As a result, the communication relay server 200 sends the stored communication message sent from the client device B to the information processing unit 300 (step S129). Then, the information processing unit 300 sends back a return message of the communication message received from the client device B to the client device B (step S131).

According to the bidirectional communication method of this embodiment, the bidirectional communication with plural mates can be achieved with convenience even if they have only limited I/O function, display function or memory resource. Such a method enables the bidirectional communication to be enjoyed without obstructing a conversation with a current bidirectional communication mate and further missing a communication message sent from other mate.

<About Hardware Structure of Content Providing Server and Information Processing Unit>

Next, the hardware structures of the content providing server 100, communication relay server 200 and information processing unit 300 according to this embodiment will be described in detail with reference to FIG. 27. FIG. 27 is a block diagram for explaining the hardware structures of the content providing server 100, communication relay server 200 and information processing unit 300.

The content providing server 100, communication relay server 200 and information processing unit 300 mainly include CPU 901, ROM 903, RAM 905, host bus 907, bridge 909, external bus 911, interface 913, input device 915, output device 917, storage device 919, drive 921, connection port 923 and communication device 925.

The CPU 901 functions as an arithmetic operation processing unit and control unit so as to control the entire operation of the content providing server 100, communication relay server 200 and information processing unit 300 or part thereof according to various programs recorded in the ROM 903, RAM 905, storage device 919, or removable recording medium 927. The ROM 903 memorizes a program and arithmetic operation parameters which the CPU 901 uses. The RAM 905 temporarily memorizes a program which the CPU 901 uses for its execution and parameters which change appropriately when the program is executed. These are connected with each other through the host bus 907 constituted of an internal bus such as CPU bus.

The host bus 907 is connected to an external bus 911 such as peripheral component interconnect/interface (PCI) through the bridge 909.

The input device 915 is an operation unit operated by user such as mouse, keyboard, touch panel, button, switch, and lever. The input device 915 may be for example, a remote control unit using infrared ray or other electric wave or an external connection device 929 such as portable phone and PDA corresponding to operations of the content providing server 100, communication relay server 200 and information processing unit 300. Further, the input device 915 is constituted of an input control circuit, which generates an input signal based on information inputted by user using the aforementioned operation unit and outputs to the CPU 901. User of the content providing server 100, the communication relay server 200 and information processing unit 300 can instruct the content providing server 100, the communication relay server 200 and information processing unit 300 to input various kinds of data and perform various processing operations by operating this input device 915.

The output device 917 is constituted of a device capable of notifying user of the acquired information visually or audibly such as display unit including CRT display unit, liquid crystal display unit, plasma display unit, EL display unit, lamp, and audio output device including speaker and head phone, and printer unit, portable phone, facsimile and the like. The output device 917 outputs a result obtained by various processings performed by the content providing server 100, communication relay server 200 and information processing unit 300. More specifically, the display unit displays the result obtained by various processings performed by the content providing server 100, communication relay server 200 and information processing unit 300 in the form of text or image. On the other hand, the audio output device converts audio signals composed of reproduced sound data and audio data to analog signals and outputs.

The storage device 919 is a data storage device constructed as an example of the memory portion of the content providing server 100, communication relay server 200 and information processing unit 300 and constituted of, for example, a magnetic memory device such as a hard disk drive (HDD), semiconductor memory device, optical memory device, photomagnetic memory device. This storage device 919 stores programs and various data to be executed by the CPU 901 and audio signal and image signal data acquired from outside.

The driver 921 is a reader/writer for recording medium and built in or externally installed to the content providing server 100, communication relay server 200 and information processing unit 300. The drive 921 reads out information recorded in an installed removable recording medium 927 such as a magnetic disk, optical disk, photomagnetic disk, semiconductor memory and outputs to the RAM 905. The drive 921 can write recording into the installed removable recording medium such as the magnetic disk, optical disk, photomagnetic disk, and semiconductor memory. The removable recording medium 927 includes, for example, DVD medium, HD-DVD medium, Blu-ray medium, compact flash (CF) (registered trade mark), memory stick, secure digital memory card (SD memory card) and the like. Further, the removable recording medium 927 may be, for example, an integrated circuit card (IC card) loaded with a non-contact IC chip or electronic device.

The connection port 923 is a port for connecting a device such as universal serial bus (USB) port, IEEE1394 port such as i.Link, small computer system interface (SCSI) port, RS-232C port, optical audio terminal, high-definition multimedia interface (HDMI) port directly to the content providing server 100, communication relay server 200 and information processing unit 300. By connecting the external connection device to this connection port 923, the content providing server 100, communication relay server 200 and information processing unit 300 can acquire audio signal data or image signal data directly from the external connection device 929 and provide audio signal data and image signal data to the external connection device 929.

The communication device 925 is a communication interface constituted of a communication device for connecting to the communication network 12. The communication device 925 is, for example, wired or wireless local area network (LAN), Bluetooth, communication card for wireless USB (WUSB), optical communication rooter, asymmetric digital subscriber line (ADSL) rooter, or various communication modems. This communication device 925 can exchange audio signal and the like with Internet and other communication device. The communication network 12 is constituted of a network connected with wire or wirelessly, for example, Internet, home LAN, infrared ray communication, radio wave communication and satellite communication may be adopted.

An example of the hardware structure, which can achieve functions of the content providing server 100, communication relay server 200 and information processing unit 300 according to the embodiment of the present invention has been described above. Each component may be constructed using a general purpose member of a hardware specified for each of the components. Therefore, the hardware construction for use may be changed appropriately corresponding to each technical level which implements this embodiment.

It should be understood by those skilled in the art that various modifications, combinations, sub-combinations and alterations may occur depending on design requirements and other factors insofar as they are within the scope of the appended claims or the equivalents thereof.

Although in the above embodiments, a case where the client device 14 executes bidirectional communication with the information processing unit 300 through the content providing sever 100 has been described, the client device 14 may execute the bidirectional communication not through the content providing server 100. In such a case, the communication relay server 200 determines the content of a communication sent from the client device 14 through the communication network 12.

What is claimed is:

1. A non-transitory computer-readable storage medium storing a program, the program, when executed, instructing an information processing unit to:
   acquire content information from a content providing server, the content information including content data and meta data of the content data;
   reproduce the content data on a display portion of the information processing unit; and
   carry out bidirectional communication with another information processing unit connected to the content providing server,
   wherein when the content data is reproduced, the program further instructs the information processing unit to determine a type of communication messages to be acquired according to different states under which the bidirectional communication is executed and to selectively acquire a communication message of the determined type from communication messages directed to the information processing unit.

2. The storage medium according to claim 1, wherein the program further instruct the information processing unit to check a server which holds the communication message of the bidirectional communication about presence/absence of a communication message sent from the another information processing unit to the information processing unit every predetermined time interval and to acquire the received communication message from the server which holds the communication message.

3. The storage medium according to claim 2, wherein the program further instructs the information processing unit to specify a number of the communication messages not received of the communication messages sent from the another information processing unit, and to display the number of the not-received communication messages on the display portion.

4. The storage medium according to claim 1, wherein the program further instructs the information processing unit to, when the bidirectional communication is carried out with the another information processing unit, receive only a communication message sent from the another information process unit which is carrying out the bidirectional communication.

5. The storage medium according to claim 1, wherein the program further instructs the information processing unit to, when the communication message sent from the another information processing unit is received, not receive other communication message sent to the information processing unit.

6. The storage medium according to claim 1, wherein the program further instructs the information processing unit to:
   display a connecting state of the another information processing unit acquired from the content providing server on the display portion during reproduction of the content data, and
   when the connecting state of the another information processing unit is displayed on the display portion, not receive the communication message of the bidirectional communication sent to the information processing unit.

7. The storage medium according to claim 1, wherein the program further instructs the information processing unit to, when the bidirectional communication with the another information processing unit is not carried out, receive all the communication messages of the bidirectional communication sent to the information processing unit.

* * * * *